United States Patent
Choi et al.

(10) Patent No.: US 12,122,877 B2
(45) Date of Patent: Oct. 22, 2024

(54) POLYMER RESIN COMPOSITION, AND POLYMER FILM, RESIN LAMINATE USING THE SAME

(71) Applicant: LG CHEM, LTD., Seoul (KR)

(72) Inventors: Il Hwan Choi, Daejeon (KR); Jiae Yeo, Daejeon (KR); Soonyong Park, Daejeon (KR); Young Ji Tae, Daejeon (KR)

(73) Assignee: LG CHEM, LTD., Seoul (KR)

( * ) Notice: Subject to any disclaimer, the term of this patent is extended or adjusted under 35 U.S.C. 154(b) by 641 days.

(21) Appl. No.: 17/418,402

(22) PCT Filed: Nov. 30, 2020

(86) PCT No.: PCT/KR2020/017302
§ 371 (c)(1),
(2) Date: Jun. 25, 2021

(87) PCT Pub. No.: WO2021/118143
PCT Pub. Date: Jun. 17, 2021

(65) Prior Publication Data
US 2022/0073680 A1  Mar. 10, 2022

(30) Foreign Application Priority Data

Dec. 9, 2019 (KR) .................. 10-2019-0163108
Dec. 10, 2019 (KR) .................. 10-2019-0163984

(51) Int. Cl.
*C08G 69/32* (2006.01)
*C08J 5/18* (2006.01)

(52) U.S. Cl.
CPC .............. *C08G 69/32* (2013.01); *C08J 5/18* (2013.01); *C08G 2250/00* (2013.01); *C08J 2377/10* (2013.01)

(58) Field of Classification Search
CPC ......... C08L 77/00; C08L 77/06; D21H 13/26; C08J 5/18; C08G 69/32
See application file for complete search history.

(56) References Cited

U.S. PATENT DOCUMENTS

| | | |
|---|---|---|
| 4,471,110 A | 9/1984 | Christell |
| 5,076,817 A | 12/1991 | Hayes |
| 5,821,319 A | 10/1998 | Shibuya et al. |
| 2006/0106193 A1 | 5/2006 | Moriyama et al. |
| 2010/0190998 A1 | 7/2010 | Musa et al. |
| 2013/0038822 A1 | 2/2013 | Aono et al. |
| 2013/0196130 A1 | 8/2013 | Hufen et al. |
| 2014/0221546 A1 | 8/2014 | Bushelman et al. |
| 2016/0194449 A1 | 7/2016 | Kim et al. |
| 2018/0066110 A1 | 3/2018 | Kim et al. |
| 2019/0359772 A1 | 11/2019 | Kim et al. |
| 2019/0359784 A1 | 11/2019 | Jeong et al. |
| 2019/0367677 A1 | 12/2019 | Oh et al. |
| 2019/0389095 A1 | 12/2019 | Oh et al. |
| 2019/0390014 A1 | 12/2019 | Kim et al. |
| 2020/0157295 A1 | 5/2020 | Hikosaka et al. |

FOREIGN PATENT DOCUMENTS

| | | |
|---|---|---|
| CN | 102869706 A | 1/2013 |
| CN | 103890039 A | 6/2014 |
| EP | 3401355 A1 | 11/2018 |
| JP | S60-011532 A | 1/1985 |
| JP | S63-161021 A | 7/1988 |
| JP | H04-267937 A | 9/1992 |
| JP | 09158094 A * | 6/1997 |
| JP | 2001-325720 A | 11/2001 |
| JP | 2015-120886 A | 7/2015 |
| JP | 2016-169291 A | 9/2016 |
| JP | 2018141082 A * | 9/2018 |
| KR | 10-1987-0001695 B1 | 9/1987 |
| KR | 10-0171699 B1 | 3/1999 |
| KR | 10-2005-0067217 A | 6/2005 |
| KR | 10-2013-0066618 A | 6/2013 |
| KR | 10-2014-0085064 A | 7/2014 |
| KR | 10-2015-0070757 A | 6/2015 |
| KR | 10-1831884 B1 | 2/2018 |
| KR | 10-2019-0118409 A | 10/2019 |
| KR | 10-2019-0131384 A | 11/2019 |
| TW | 200420412 A | 10/2004 |
| TW | 200904854 A | 2/2009 |
| TW | 201341464 A | 10/2013 |
| WO | 2004-039863 A1 | 5/2004 |
| WO | 2018-207830 A1 | 11/2018 |

OTHER PUBLICATIONS

Hyun, H. S. et al., "Anisotropic properties of aromatic polyamides containing non-rigid rodlike units", Polymer bulletin, 1990, vol. 23, No. 6, pp. 623-629.
International Search Report issued for International Application No. PCT/KR2020/017302 on Mar. 5, 2021, 5 pages.

* cited by examiner

*Primary Examiner* — Gregory Listvoyb
(74) *Attorney, Agent, or Firm* — ROTHWELL, FIGG, ERNST & MANBECK, P.C.

(57) ABSTRACT

The present disclosure relates to a polymer resin composition including a polyamide resin in which an average particle size of individual crystals measured by a small-angle X-ray scattering apparatus is reduced through an alternating segment structure, and at least one selected from the group consisting of a metal salt compound and an end-capping agent compound, and a polymer film and a resin laminate using the same.

15 Claims, 3 Drawing Sheets

[FIG. 1]
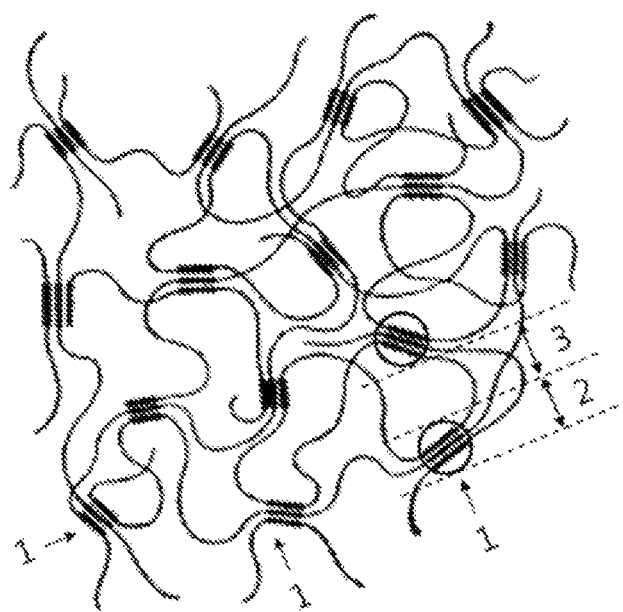

[FIG. 2]
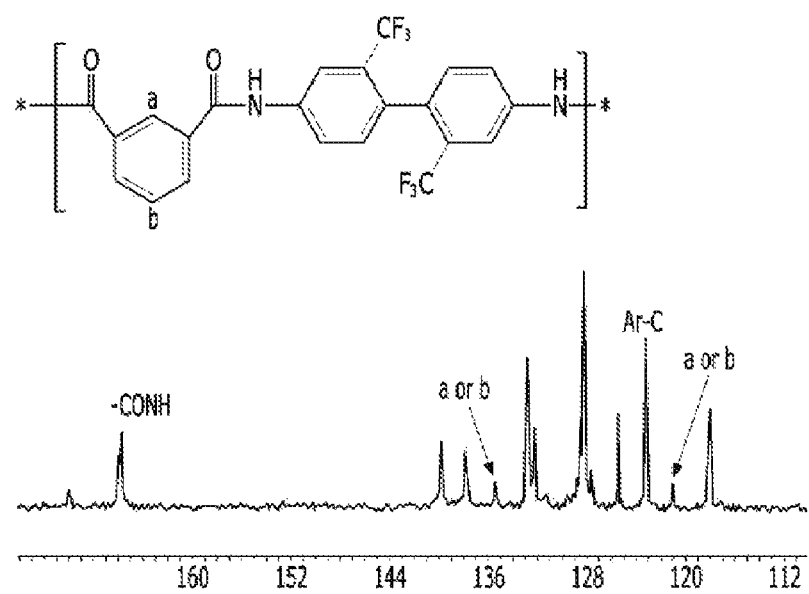

[FIG. 3]
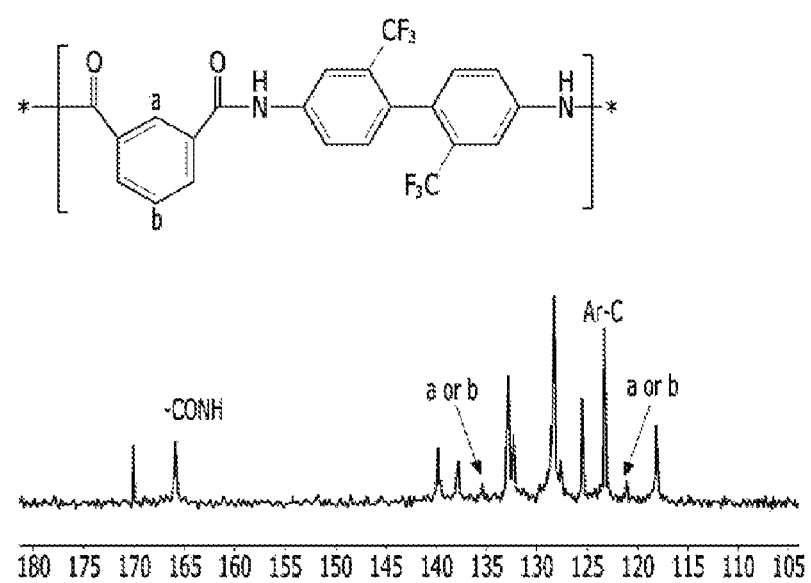

POLYMER RESIN COMPOSITION, AND POLYMER FILM, RESIN LAMINATE USING THE SAME

TECHNICAL FIELD

Cross-Reference to Related Application(s)

This application is a 35 U.S.C. 371 National Phase Entry Application from PCT/KR2020/017302, filed on Nov. 30, 2020 and designating the United States, which claims the benefit of Korean Patent Application No. 10-2019-0163108 filed on Dec. 9, 2019 and Korean Patent Application No. 10-2019-0163984 filed on Dec. 10, 2019 in the Korean Intellectual Property Office, all of which are incorporated herein by references in their entirety.

The present disclosure relates to a polymer resin composition having improved processability during film formation by controlling a rapid increase in viscosity, and a polymer resin composite, a polymer film and a resin laminate using the same.

The present disclosure also relates to a polymer resin composition having improved storage stability during long-term storage, and a polymer film and a resin laminate using the same.

BACKGROUND OF THE INVENTION

Aromatic polyimide resins are polymers mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in use because they may appear dark brown in color due to the formation of a charge transfer complex (CTC) of Pi-electrons present in the imide chain, and it is difficult to secure transparency. In the case of the polyimide film including the same, it has a drawback in that the surface is easily scratched and scratch resistance is very weak.

In order to solve the above limitation of the polyimide resin, studies on polyamide resins into which an amide group is introduced has been actively conducted. The amide structure induces intermolecular or intramolecular hydrogen bonds, resulting in improvement of scratch resistance by interactions such as hydrogen bonds.

However, due to the difference in solubility, reactivity (steric hindrance), and reaction rate of terephthaloyl chloride or isophthaloyl chloride used for the synthesis of the polyamide resin, amide repeat units derived from terephthaloyl chloride and amide repeat units derived from isophthaloyl chloride do not form a block, and are hardly polymerized ideally or alternatively.

Therefore, there is a limit that as the block of amide repeat units derived from the para acyl chloride monomer is formed and the crystallinity of the polyamide resin increases, the transparency becomes poor due to haze.

In addition, as the monomers used for the synthesis of the polyamide resin perform the polymerization reaction in a state dissolved in a solvent, the molecular weight of the finally synthesized polyamide resin is difficult to be ensured to a sufficient level due to deterioration by moisture or hybridization with a solvent.

BRIEF SUMMARY OF THE INVENTION

The present disclosure provides a polymer resin composition having improved processability during film formation by controlling a rapid increase in viscosity.

The present disclosure also provides a polymer resin composition having improved storage stability during long-term storage.

The present disclosure further provides a polymer resin composite, a polymer film and a resin laminate using the polymer resin composition.

One aspect of the present disclosure provides a polymer resin composition including: a polyamide resin in which an average particle size of individual crystals measured by a small-angle X-ray scattering apparatus is 8.0 nm or less; and at least one selected from the group consisting of a metal salt compound and an end-capping agent compound.

Another aspect of the present disclosure provides a polymer film including a cured product of the polymer resin composition.

Yet another aspect of the present disclosure provides a resin laminate including a substrate including the polymer film; and a hard coating layer formed on at least one side of the substrate.

DETAILED DESCRIPTION OF THE INVENTION

Hereinafter, a polymer resin composition and a polymer film and resin laminate using the same according to specific embodiments of the present disclosure will be described in more detail.

Unless explicitly stated otherwise, the terminology used herein may be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a haloalkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked. Preferably, a haloalkyl group can be used as the substituent, and examples of the haloalkyl group include trifluoromethyl group.

As used herein, the notation  or  means a bond linked to another substituent group, and a direct bond means the case where no other atoms exist in the parts represented as L.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched-chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, 2,6-dimethylheptane-4-yl and the like, but are not limited thereto. The alkyl group may be substituted or unsubstituted, and when it is substituted, examples of the substituent are as described above.

In the present specification, the alkenyl group may be straight-chain or branched-chain, and the carbon number thereof is not particularly limited, but is preferably 2 to 40. According to one embodiment, the carbon number of the alkenyl group is 2 to 20. According to another embodiment, the carbon number of the alkenyl group is 2 to 10. According to still another embodiment, the carbon number of the alkenyl group is 2 to 6. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto. The alkenyl group may be substituted or unsubstituted, and when it is substituted, examples of the substituent are as described above.

In the present specification, a cycloalkyl group is a monovalent functional group derived from cycloalkane, and may be monocyclic or polycyclic, and is not particularly limited, but the number of carbon atoms thereof is preferably 3 to 20. According to another embodiment, the number of carbon atoms of the cycloalkyl group is 3 to 10. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, bicyclo[2,2,1]heptyl, and the like, but are not limited thereto. The cycloalkyl group may be substituted or unsubstituted, and when it is substituted, examples of the substituent are as described above.

In the present specification, the aryl group is a monovalent functional group derived from an arene, and is not particularly limited, but preferably has 6 to 20 carbon atoms, and may be a monocyclic aryl group or a polycyclic aryl group. The monocyclic aryl group may include a phenyl group, a biphenyl group, a terphenyl group, or the like, but is not limited thereto. The polycyclic aryl group may include a naphthyl group, an anthracenyl group, a phenanthryl group, a pyrenyl group, a perylenyl group, a chrycenyl group, a fluorenyl group or the like, but is not limited thereto. The aryl group may be substituted or unsubstituted, and when it is substituted, examples of the substituent are as described above.

In the present specification, the alkylene group is a bivalent functional group derived from alkane, and the description of the alkyl group as defined above may be applied except that it is a divalent functional group. The alkylene group may be a straight chain or a branched-chain, examples of which include a methylene group, an ethylene group, a propylene group, an isobutylene group, a sec-butylene group, a tert-butylene group, a pentylene group, a hexylene group, and the like. The alkylene group may be substituted or unsubstituted, and when it is substituted, examples of the substituent are as described above.

In the present specification, the alkenylene group is a bivalent functional group derived from alkene, and the description of the alkenyl group as defined above may be applied except that it is a divalent functional group. The alkenylene group may be a straight chain or a branched-chain, examples of which include 1-propenylene, isopropenylene, 1-butenylene, 2-butenylene, and the like. The alkenylene group may be substituted or unsubstituted, and when it is substituted, examples of the substituent are as described above.

In the present specification, the cycloalkylene group is a bivalent functional group derived from cycloalkane, and the description of the cycloalkyl group as defined above may be applied except that it is a divalent functional group. The cycloalkylene group may be substituted or unsubstituted, and when it is substituted, examples of the substituent are as described above.

In the present specification, the arylene group is a bivalent functional group derived from an arene, and the description of the aryl group as defined above may be applied, except that it is a divalent functional group. For example, it may be a phenylene group, a biphenylene group, a terphenylene group, a bivalent naphthalene group, a bivalent fluorenyl group, a bivalent pyrenyl group, a bivalent phenanthrenyl group, a bivalent perylene group, a bivalent tetracenyl group, a bivalent anthracenyl group and the like. The arylene group may be substituted or unsubstituted, and when it is substituted, examples of the substituent are as described above.

In the present specification, a heteroaryl group may include one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 4 to 20, and the heteroaryl group may be monocyclic or polycyclic. Examples of a heteroaryl group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridyl group, an azaindolyl group, an isoindolyl group, an indazolyl group, a purine group (purine), a pteridyl group (pteridine), a beta-carboline group, a naphthyridyl group (naphthyridine), a terpyridyl group, a phenazinyl group, an imidazopyridyl group, a pyrrolopyridyl group, an azepine group, a pyrazolyl group, a dibenzofuranyl group, and the like, but are not limited thereto. The heteroaryl group may be substituted or unsubstituted, and when it is substituted, examples of the substituent are as described above.

In the present specification, the hetero arylene group has 2 to 20, or 2 to 10, or 6 to 20 carbon atoms. For the arylene group containing O, N or S as a hetero atom, the description of the heteroaryl group as defined above can be applied except that it is a divalent functional group. The hetero arylene group may be substituted or unsubstituted, and when it is substituted, examples of the substituent are as described above.

In this specification, examples of halogen include fluorine, chlorine, bromine or iodine.

According to one embodiment of the present disclosure, there can be provided a polymer resin composition including: a polyamide resin in which an average particle size of individual crystals measured by a small-angle X-ray scattering apparatus is 8.0 nm or less; and at least one selected from the group consisting of a metal salt compound and an end-capping agent compound.

The present inventors have found through experiments that by adding the metal salt compound together with the polyamide resin, it is possible to control the rapid increase in viscosity of the composition containing the polyamide resin, and also in the film forming process using the composition containing the polyamide resin, the processability is improved to thereby secure the efficiency of the film forming process, and completed the invention.

In addition, the inventors have found through experiments that by adding the end-capping agent compound together with the polyamide resin, even if the composition containing the polyamide resin is stored for a long period of time, it has little change in physical properties, thereby realizing excellent storage stability, and completed the invention.

In particular, the polyamide resin in which an average particle size of individual crystals is 8.0 nm or less not only has excellent mechanical properties possessed by a crystalline polymer but also the growth of individual crystals forming the crystal structure slows down to have a relatively small size, whereby it has a remarkably low level of haze value, yellowness, etc., and additionally can have high flexibility and bending durability.

Unlike this, when the average particle size of individual crystals measured for the polyamide resin by a small-angle X-ray scattering apparatus increases excessively by more than 8.0 nm, the ratio occupied by the portion having crystallinity in the polyamide resin or the size thereof is excessively grown, whereby the crystal characteristic is strongly implemented, the flexibility or bending durability of the polymer itself is lowered, the haze value is rapidly increased and so the transparency can be lowered.

The average particle size physical properties of the individual crystals of the polyamide resin is considered to be caused by the fact that a first polyamide segment and a second polyamide segment form an alternating polymer backbone, and the second polyamide segments are located between the first polyamide segments, and suppress the growth of the length of the first polyamide segment.

When the length growth of the first polyamide segment is suppressed in this way, the haze value of the polyamide resin film can be significantly reduced while reducing the crystal characteristics of the first polyamide segment, thus realizing excellent transparency.

On the other hand, "the backbone chain of the polyamide resin forms a polymer backbone chain where a first polyamide segment and a second polyamide segment alternate along the backbone chain" is considered to be caused by the formation of a melt-kneaded complex in the preparation method of the polyamide resin.

Hereinafter, the present disclosure will be described in more detail.

1. Polymer Resin Composition

The polymer resin composition may include a polyamide resin. The polyamide resin may include an amide (co)polymer containing a polyamide repeat unit. The (co)polymer is meant to include both a polymer and a copolymer, the polymer means a homopolymer consisting of a single repeat unit, and the copolymer means a composite polymer containing two or more types of repeat units.

The polyamide resin can satisfy an average particle size of individual crystals of 8.0 nm or less as measured by a small-angle X-ray scattering apparatus. The polyamide resin may include a plurality of individual crystals. The average particle size of the individual crystals contained in the polyamide resin can be determined through the method for calculating the number average particle which includes confirming the particle sizes of the total crystals contained in the polyamide resin and then dividing the sum of these particle sizes by the number of individual crystals.

The average particle size of the individual crystals can be measured through an analytical equipment by irradiating X-rays with energies of 10 KeV to 20 KeV, or 10 KeV to 14 KeV, or 16 KeV to 20 KeV in a small-angle X-ray scattering apparatus and fitting the obtained scattering pattern to a solid sphere model.

As for the X-rays to be irradiated, for example, a method of irradiating X-rays with energies of 10 KeV to 14 KeV and X-rays together with energies of 16 KeV to 20 KeV can be used.

The scattering pattern, which is the data obtained from the small-angle X-ray scattering apparatus, may be a result measured by irradiating X-rays with energies of 10 KeV to 20 KeV using the small-angle X-ray scattering apparatus at a temperature of 20° C. to 30° C. As a detector in the small-angle X-ray scattering apparatus, an imaging plate, a position-sensitive detector (PSPC), and the like can be used.

Subsequently, an average particle size analysis of the individual crystals may be performed through an analytical equipment that is separately installed inside or outside the small-angle X-ray scattering apparatus. An example of the small-angle X-ray scattering apparatus may be a PLS 9A beamline, and an example of the analytical equipment may be a NIST SANS package which is a computer program.

Specifically, the average particle size of the individual crystals can be determined through the calculation of computer program (NIST SANS package) for the diameter distribution curve of crystals which is obtained by fitting the shape of individual crystals contained in the sample to a solid sphere model, plotting the obtained wavenumber q (unit: $Å^{-1}$) and scattering intensity I (unit: a.u.), and convoluting the plot with a Schulz-Zimm distribution.

The crystals can be a group of individual crystals having a particle size of 0.1 nm to 15 nm, and the individual crystals contained in such group can have an average particle size of 8 nm or less. More specifically, 95%, or 99% of the individual crystals contained in the group may have a particle size of 8 nm or less. That is, as the majority of the individual crystals has a particle size of 8 nm or less, or 7 nm or less, or 0.1 nm to 8.0 nm, or 0.1 nm to 7 nm, or 1 nm to 8 nm, or 1 nm to 7 nm, or 3 nm to 8 nm, or 3 nm to 7 nm, or 5 nm to 6.8 nm, the average particle size of the individual crystals may also satisfy the above-mentioned range.

More specifically, the average particle size of the individual crystals measured by the small-angle X-ray scattering apparatus may be 8.0 nm or less, or 7 nm or less, or 0.1 nm to 8.0 nm, or 0.1 nm to 7 nm, or 1 nm to 8 nm, or 1 nm to 7 nm, or 3 nm to 8 nm, or 3 nm to 7 nm, or 5 nm to 6.8 nm.

Specifically, when the polyamide resin sample is irradiated with X-rays using the small-angle X-ray scattering apparatus, the small-angle X-ray scattering pattern is secured through a detector. When analyzing this through an analytical equipment, it is possible to determine the average radius (Rc) value of the individual crystals contained in the polyamide resin sample. Through this, finally, the average particle size of the individual crystals can be determined by calculating two-fold value the average radius (Rc) of the individual crystals described above.

More specifically, with reference to the crystal structure of the polyamide resin of one embodiment described in FIG. 1 below, the polyamide resin is composed of amorphous polymer chains 3 present between individual crystals, together with a plurality of individual crystals 1, and a particle size 2 can be defined for the individual crystals.

On the other hand, the individual crystals 1 may be formed by gathering polyamide resin chains in a bundle. In particular, the length of the individual crystals can be grown through the overlap between the crystalline polymer blocks contained in the polyamide resin. It is difficult to specifically specify the shape of the overlapped individual crystals, but it can be seen that it has roughly a spherulite structure by three-dimensional growth, a lamella structure by two-dimensional growth, or an intermediate structure between three-dimensional and two-dimensional.

Preferably, the polyamide resin may have a dimensionality of the individual crystals measured by a small-angle X-ray scattering apparatus of 3.0 or more, or 3.0 to 4.0. The dimensionality of the individual crystals of the polyamide resin can be measured through an analytical instrument by irradiating X-rays with energies of 10 KeV to 20 KeV, or 10 KeV to 14 KeV, or 16 KeV to 20 KeV in a small-angle X-ray scattering apparatus and fitting the obtained spherical scattering pattern to a solid sphere model. The small-angle X-ray scattering apparatus and the contents of the analysis thereon include the contents described above in the average particle size of the individual crystals.

Meanwhile, the polyamide resin may further include amorphous polymer chains present between the individual crystals having an average particle size of 8.0 nm or less. More specifically, with reference to the crystal structure of the polyamide resin of one embodiment described in FIG. 1 below, the polyamide resin may be composed of amorphous polymer chains 3 present between individual crystals 1 together with a plurality of individual crystals 1.

Due to the amorphous polymer chains, the growth of the average particle size of the individual crystals is suppressed, and the polyamide resin may satisfy an average particle size of individual crystals of 8.0 nm or less as measured by a small-angle X-ray scattering apparatus.

In this case, the distance between the individual crystals having an average particle size of 8.0 nm or less may be 0.1 nm to 100 nm, or 1 nm to 100 nm, or 30 nm to 100 nm. The distance between individual crystals having an average particle size of 8.0 nm or less can also be measured by a small-angle X-ray scattering apparatus.

In the polyamide resin, examples of specific components of the individual crystals in which an average particle size measured by a small-angle X-ray scattering apparatus is 8.0 nm or less are not particularly limited, and various aromatic amide repeat units used in the preparation of crystalline polyamide resins can be applied without limitation.

An example of the component of the individual crystals in which an average particle size measured by the small-angle X-ray scattering apparatus is 8.0 nm or less may include a first aromatic amide repeat unit derived from a product of a 1,4-aromatic diacyl compound and an aromatic diamine compound. The polymer chains composed of the first aromatic amide repeat units may be gathered in a bundle to form individual crystals having an average particle size of 8.0 nm or less.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2', 5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4, 4'-biphenyldiamine.

More specifically, the individual crystals having an average particle size of 8.0 nm or less may include a first polyamide segment including a repeat unit represented by the following Chemical Formula 1, or a block comprised thereof.

[Chemical Formula 1]

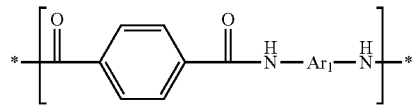

in Chemical Formula 1, $Ar_1$ is a substituted or unsubstituted arylene group having 6 to 20 carbon atoms, or a substituted or unsubstituted heteroarylene group having 2 to 20 carbon atoms.

In Chemical Formula 1, $Ar_1$ is an arylene group having 6 to 20 carbon atoms that is substituted with one or more substituents selected from the group consisting of an alkyl group, a haloalkyl group, and an amino group, and more preferably, it may be a 2,2'-bis(trifluoromethyl)-4,4'-biphenylene group.

More specifically, in Chemical Formula 1, $Ar^1$ may be a divalent organic functional group derived from an aromatic diamine monomer, and specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis (4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The first polyamide segment may include the repeat unit represented by Chemical Formula 1, or a block composed of the repeat unit represented by Chemical Formula 1.

Specific examples of the repeat unit represented by Chemical Formula 1 include a repeat unit represented by the following Chemical Formula 1-1.

[Chemical Formula 1-1]

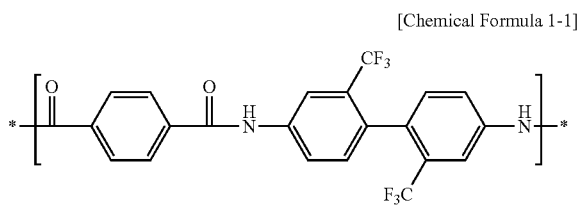

The repeat unit represented by Chemical Formula 1 is an amide repeat unit derived from a product of a 1,4-aromatic diacyl compound and an aromatic diamine compound, specifically, an amide repeat unit formed by an amidation reaction of terephthaloyl chloride or terephthalic acid with an aromatic diamine monomer. Due to the linear molecular structure, the chain packing and alignment can be kept constant in the polymer, and the surface hardness and mechanical properties of the polyamide film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol to 5000 g/mol, or 100 g/mol to 3000 g/mol, or 100 g/mol to 2500 g/mol, or 100 g/mol to 2450 g/mol. When the number average molecular weight of the first polyamide segment is increased by more than 5000 g/mol, the chains of the first polyamide segment become excessively long and so the crystallinity of the polyamide resin can be increased, whereby it may have a high haze value and so it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 8.

[Chemical Formula 8]

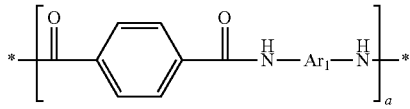

in Chemical Formula 8, $Ar_1$ is a substituted or unsubstituted arylene group having 6 to 20 carbon atoms, or a substituted or unsubstituted heteroarylene group having 2 to 20 carbon atoms, and a is an integer of 1 to 5. In Chemical Formula 8, when a is 1, the Chemical Formula 8 may be the repeat unit represented by Chemical Formula 1. In Chemical Formula 8, when a is 2 to 5, the Chemical Formula 8 may be a block composed of the repeat units represented by Chemical Formula 1. In Chemical Formula 8, the details concerning $Ar_1$ includes those described above in Chemical Formula 1.

Based on the total repeat units contained in the polyamide resin, the ratio of the repeat unit represented by Chemical Formula 1 may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the repeat unit represented by Chemical Formula 1 is contained in the above-mentioned content can ensure a sufficient level of molecular weight, thereby ensuring excellent mechanical properties.

Further, in the polyamide resin, examples of specific components of the amorphous polymer chains present between the individual crystals having an average particle size of 8.0 nm or less are not particularly limited, and various aromatic amide repeat units used in the preparation of amorphous polyamide resins can be applied without limitation.

Examples of an amorphous polymer chain component present between individual crystals in which an average particle size measured by the small-angle X-ray scattering apparatus is 8.0 nm or less may include a second aromatic amide repeat unit derived from a product of a 1,2-aromatic diacyl compound and an aromatic diamine compound, or a third aromatic amide repeat unit derived from a product of a 1,3-aromatic diacyl compound and an aromatic diamine compound, or mixtures thereof. The polymer chains composed of the second aromatic amide repeat unit or the third aromatic amide repeat unit can realize amorphous characteristics.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]

propane, 1,3-bis(4-aminophenoxy)benzene, m-xylylenediamine, p-xylylenediamine and 4,4'-diaminobenzanilide.

Preferably, the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

More specifically, the amorphous polymer chains present between the individual crystals having an average particle size of 8.0 nm or less including the first polyamide segment including the repeat unit represented by Chemical Formula 1 or a block composed thereof may include a second polyamide segment including a repeat unit represented by the following Chemical formula 2, or a block composed thereof.

[Chemical Formula 2]

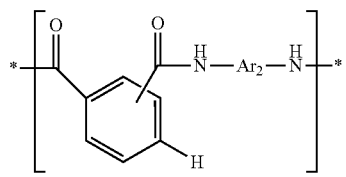

in Chemical Formula 2, $Ar_2$ is a substituted or unsubstituted arylene group having 6 to 20 carbon atoms, or a substituted or unsubstituted heteroarylene group having 2 to 20 carbon atoms.

In Chemical Formula 2, $Ar_2$ may be an arylene group having 6 to 20 carbon atoms that is substituted with one or more substituents selected from the group consisting of an alkyl group, a haloalkyl group, and an amino group, more preferably, a 2,2'-bis(trifluoromethyl)-4,4'-biphenylene group.

More specifically, in Chemical Formula 2, $Ar_2$ may be a divalent organic functional group derived from an aromatic diamine monomer. Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The second polyamide segment may include the repeat unit represented by Chemical Formula 2, or a block composed of the repeat unit represented by Chemical Formula 2.

More specifically, the repeat unit represented by Chemical Formula 2 may include one type of repeat unit selected among a repeat unit represented by the following Chemical Formula 2-1; or a repeat unit represented by Chemical Formula 2-2.

[Chemical Formula 2-1]

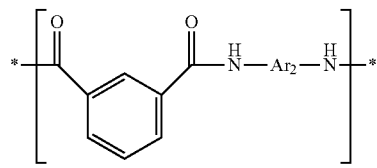

[Chemical Formula 2-2]

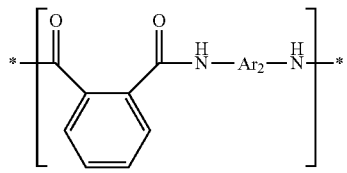

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The details concerning $Ar_2$ include those described above in Chemical Formula 2.

The repeat unit represented by Chemical Formula 2-1 is a repeat unit formed by an amidation reaction of isophthaloyl chloride or isophthalic acid with an aromatic diamine monomer, and the repeat unit represented by Chemical Formula 2-2 is a repeat unit formed by an amidation reaction of phthaloyl chloride or phthalic acid with an aromatic diamine monomer.

Specific examples of the repeat unit represented by Chemical Formula 2-1 include a repeat unit represented by the following Chemical Formula 2-4.

[Chemical Formula 2-4]

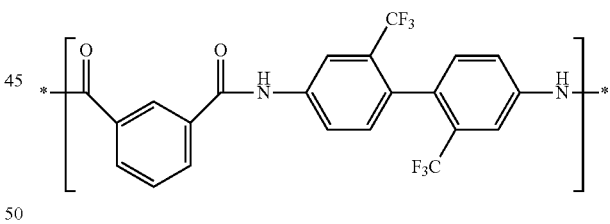

Specific examples of the repeat unit represented by Chemical Formula 2-2 include a repeat unit represented by the following Chemical Formula 2-5.

[Chemical Formula 2-5]

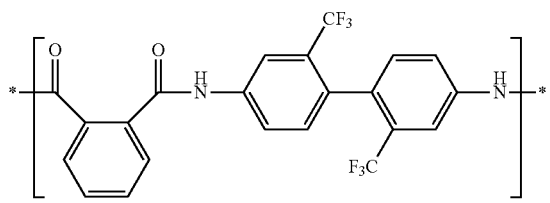

On the other hand, the second polyamide segment may be represented by the following Chemical Formula 9.

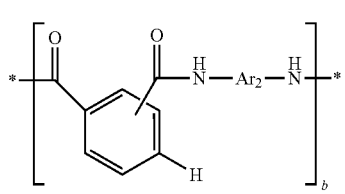

[Chemical Formula 9]

In Chemical Formula 9, $Ar_2$ is a substituted or unsubstituted arylene group having 6 to 20 carbon atoms, or a substituted or unsubstituted heteroarylene group having 2 to 20 carbon atoms, and b is an integer of 1 to 3 or 1 to 2. In Chemical Formula 9, when b is 1, the Chemical Formula 9 may be the repeat unit represented by Chemical Formula 2. In Chemical Formula 9, when b is 2 to 3, the Chemical Formula 9 may be a block composed of the repeat unit represented by Chemical Formula 2.

The repeat unit represented by Chemical Formula 2 is a repeat unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeat unit represented by Chemical Formula 1, it is possible to increase the molecular weight of the polyamide resin.

Based on the total repeat units contained in the polyamide resin, the ratio of the repeat unit represented by Chemical Formula 2 may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

As described above, the polyamide resin in which the repeat unit represented by Chemical Formula 2 is contained in the above-mentioned content can suppress the length growth of the chains consisting of only the specific repeat unit represented by Chemical Formula 1 and thus lower the crystallinity of the resin, whereby it is possible to have a low haze value and thus secure excellent transparency.

More specifically, based on the total repeat units contained in the polyamide resin, the content of the repeat unit represented by Chemical Formula 1 may be 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeat unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeat unit represented by Chemical Formula 1 and thus maximize the effect of improving the surface hardness and mechanical properties of the polyamide film according to the chain packing and alignment within the polymer due to the linear molecular structure of the repeat unit represented by Chemical Formula 1. In addition, although the repeat unit represented by Chemical Formula 2 has a relatively low molar content, it can suppress the length growth of the chains consisting of only the specific repeat unit represented by Chemical Formula 1, and thus lower the crystallinity of the resin, whereby, it is possible to have a low haze value and thus secure excellent transparency.

On the other hand, the first polyamide segment and the second polyamide segment may form a backbone chain containing an alternating repeat unit represented by the following Chemical Formula 3. That is, the first polyamide segment contained in the individual crystals in which an average particle size measured by the small-angle X-ray scattering apparatus is 8.0 nm or less may form an alternating repeat unit represented by the following Chemical Formula 3 with the second polyamide segment contained in the amorphous polymer chain existing between the individual crystals.

As a result, the polyamide resin of one embodiment has a structure in which a plurality of individual crystals and amorphous polymer chains are repeated, as in the crystal structure shown in FIG. 1, and it is possible to suppress the continuous size growth of only individual crystals. Thereby, the individual crystals allow an average particle size measured by a small-angle X-ray scattering apparatus to reduce to 8.0 nm or less.

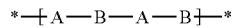

[Chemical Formula 3]

in Chemical Formula 3, A is the first polyamide segment, and B is the second polyamide segment.

Specifically, in the main chain of the polyamide resin, a first polyamide segment derived from terephthaloyl chloride or terephthalic acid and a second polyamide segment derived from isophthaloyl chloride, isophthalic acid or phthaloyl chloride, phthalic acid may alternately form a polymer chain as shown in Chemical Formula 3. That is, the second polyamide segment is positioned between the first polyamide segments, and may serve to suppress the growth of the length of the first polyamide segment.

The second polyamide segment is included in an amorphous polymer chain present between individual crystals having an average particle size of 8.0 nm or less, and the first polyamide segment is included in individual crystals having an average particle size of 8.0 nm or less. Therefore, in the polyamide resin, the amorphous polymer chain may be positioned between individual crystals having an average particle size of 8.0 nm or less, and may serve to suppress the growth of the size of the individual crystals. This can also be confirmed through the crystal structure shown in FIG. 1.

When the size growth of the individual crystals is suppressed in this manner, it is possible to remarkably lower the haze value of the polyamide resin while reducing crystal properties by the individual crystals, thereby achieving excellent transparency.

On the other hand, "the backbone chain of the polyamide resin forms a polymer chain where a first polyamide segment derived from terephthaloyl chloride or terephthalic acid and a second polyamide segment derived from isophthaloyl chloride, isophthalic acid or phthaloyl chloride, phthalic acid alternate along the backbone chain as shown in Chemical Formula 3" is considered to be due to the formation of a melt-kneaded complex in the preparation method of the polyamide resin of the present disclosure described hereinafter.

When explanation is made by enumerating concrete examples, the alternating repeat unit represented by Chemical Formula 3 may be a repeat unit represented by the following Chemical Formula 4.

[Chemical Formula 4]

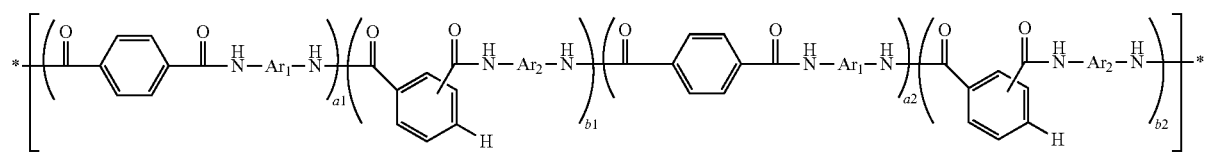

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are each independently an integer of 1 to 10, or 1 to 5, and b1 and b2 are each independently an integer of 1 to 5, or 1 to 3.

In Chemical Formula 4, the crystalline polymer block (derived from terephthaloyl chloride or terephthalic acid) having the number of repeat units of a1 or a2 may form individual crystals in which an average particle size measured by the small-angle X-ray scattering apparatus is 8.0 nm or less. In addition, in Chemical Formula 4, the amorphous polymer block (derived from isophthaloyl chloride, isophthalic acid or phthaloyl chloride, phthalic acid) having the number of repeat units of b1 or b2 may form an amorphous polymer chain existing between individual crystals in which an average particle size measured by a small-angle X-ray scattering apparatus is 8.0 nm or less.

That is, the polyamide resin may include a first polyamide segment including a repeat unit represented by Chemical Formula 1 or a block composed thereof; and a second polyamide segment including a repeat unit represented by Chemical Formula 2, or a block composed thereof, wherein the first polyamide segment and the second polyamide segment may form a backbone chain containing an alternating repeat unit represented by Chemical Formula 3.

The present inventors have found through experiments that as the average particle size of the individual crystals is reduced by 8.0 nm or less as in the polyamide resin of one embodiment, it is possible to minimize the growth of the length of the polymer block (hereinafter, referred to as the first polyamide segment) consisting of repeat units derived from terephthaloyl chloride or terephthalic acid in the polyamide resin and lower the crystallinity of the polyamide resin, thus implementing a transparent polyamide resin. The present disclosure has been completed on the basis of such finding.

Specifically, the backbone chain of the polyamide resin may form a polymer chain where a crystalline polymer block derived from terephthaloyl chloride or terephthalic acid (hereinafter, referred to as first polyamide segment) and an amorphous polymer block derived from isophthaloyl chloride, isophthalic acid or phthaloyl chloride, phthalic acid (hereinafter, referred to as second polyamide segment) alternate along the backbone chain. That is, the second polyamide segment is located between the first polyamide segments, and may serve to suppress the growth of the length of the first polyamide segment.

In this case, the first polyamide segment is included in the individual crystals of the polyamide resin to express crystal properties, and the second polyamide segment is included in the amorphous polymer chain between the individual crystals to express amorphous properties.

Therefore, when the length growth of the first polyamide segment is suppressed, the average particle size of the individual crystals measured by a small-angle X-ray scattering apparatus is measured to be relatively small. Since the polyamide resin can remarkably reduce the haze value while reducing the crystal properties of the first polyamide segment, it is possible to achieve excellent transparency.

On the contrary, when the effect of suppressing the length growth of the first polyamide segment by the second polyamide segment is reduced, and the length growth of the first polyamide segment proceeds excessively, the average particle size of the individual crystals measured by the small-angle X-ray scattering apparatus is measured to be relatively large, the polyamide resin may have poor transparency while increasing the crystal properties of the first polyamide segment and rapidly increasing the haze value.

And yet, the polyamide resin can have a sufficient level of weight average molecular weight, whereby a sufficient level of mechanical properties can also be achieved.

Meanwhile, the polyamide resin may have a degree of crystallinity of 20% or less, or 1% to 20%, as measured by a small-angle X-ray scattering apparatus. The degree of crystallinity of the polyamide resin can be measured through an analytical instrument by irradiating X-rays with energies of 10 KeV to 20 KeV, or 10 KeV to 14 KeV, or 16 KeV to 20 KeV in a small-angle X-ray scattering apparatus and fitting the obtained scattering pattern to a solid sphere model. The small-angle X-ray scattering apparatus and the analysis contents thereof include the contents described above in the average particle size of the individual crystals.

The weight average molecular weight of the polyamide resin may be 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the polyamide resin is measured to be high is considered to be due to the formation of a melt-kneaded complex in the preparation method of the polyamide resin of another embodiment of the present disclosure described hereinafter. When the weight average molecular weight is reduced by less than 330,000 g/mol, the polyamide resin has a problem that mechanical properties such as flexibility and pencil hardness are lowered.

The polydispersity index (molecular weight distribution) of the polyamide resin may be 3.0 or less, or 1.5 or more and 3.0 or less, or 1.6 or more and 3.0 or less, or 1.8 or more and 3.0 or less, or 1.88 or more and 2.95 or less. Through such narrow range of polydispersity index, the polyamide resin can improve mechanical properties such as bending properties or hardness properties. When the polydispersity index of the polyamide resin becomes too wide by more than 3.0, there is a limit in that it is difficult to improve the above-mentioned mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.56% to 0.97%. When the haze of the polyamide resin measured according to ASTM D1003 is increased by more than 3.0%, the opacity is increased and thus, it is difficult to secure a sufficient level of transparency.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and at the same time, may have the haze measured according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.56% to 0.97%.

As an example of the method for preparing the polyamide resin of one embodiment, a method for preparing a polyamide resin including a step of melt-kneading a compound represented by the following Chemical Formula 10 and a compound represented by the following Chemical Formula 11, and solidifying the melt-kneaded product to form a complex; and a step of reacting the complex with an aromatic diamine monomer can be used.

[Chemical formula 10]

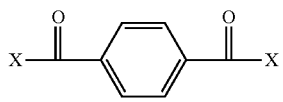

[Chemical formula 11]

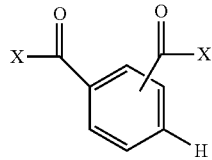

in Chemical Formulas 10 to 11, X is a halogen or a hydroxyl group.

The present inventors have found through experiments that when the compound represented by Chemical Formula 10 and the compound represented by Chemical Formula 11 are mixed at a temperature equal to or higher than the melting point as in the method for preparing the polyamide resin, it is possible to prepare a complex of monomers mixed uniformly through the melting of the compound represented by Chemical Formula 10 and the compound represented by Chemical Formula 11, and that as this complex is reacted with an aromatic diamine monomer, an amide repeat unit derived from the compound represented by Chemical Formula 10, or a block composed thereof, and an amide repeat unit derived from the compound represented by Chemical Formula 11, or a block composed thereof can be subjected to alternating polymerization, and completed the invention.

That is, the polyamide resin of one embodiment can be obtained by the preparation method of the polyamide resin.

Specifically, each of the compound represented by Chemical Formula 10 and the compound represented by Chemical Formula 11 exhibits different aspects in solubility and reactivity due to chemical structural differences. Therefore, even when they are added simultaneously, there was a limit in that the amide repeat unit derived from the compound represented by Chemical Formula 10 is predominantly formed and long blocks are formed, thereby increasing the crystallinity of the polyamide resin and making it difficult to secure transparency.

Thus, in the preparation method of the polyamide resin, the compound represented by Chemical Formula 10 and the compound represented by Chemical Formula 11 are not simply physically mixed, but through the formation of a complex by melt-kneading at a temperature higher than each melting point, each monomer was induced to react relatively evenly with the aromatic diamine monomer.

Meanwhile, when synthesizing existing polyamide resin, as the compound represented by Chemical Formula 10 and the compound represented by Chemical Formula 11 are dissolved in a solvent and then reacted with an aromatic diamine monomer in a solution state, there was a limit in that due to the deterioration by moisture or mixing in solvents, the molecular weight of the finally synthesized polyamide resin decreases. Further, due to the difference in the solubility of the compound represented by Chemical Formula 10 and the compound represented by Chemical Formula 11, there was a limit in that the amide repeat unit derived from the compound represented by Chemical Formula 10 is predominantly formed and long blocks are formed, thereby increasing the crystallinity of the polyamide resin and making it difficult to secure transparency.

Thus, it has been found through experiments that in the preparation method of the polyamide resin, as the compound represented by Chemical Formula 10 and the compound represented by Chemical Formula 11 are melt-kneaded and the obtained complex are reacted with the aromatic diamine monomer dissolved in the organic solvent in the form of a solid powder through cooling at a temperature lower than each melting point (minus 10° C. to 30° C., or 0° C. to 30° C., or 10° C. to 30° C.), the molecular weight of the finally synthesized polyamide resin is improved, so that excellent mechanical properties are secured.

Specifically, the method for preparing the polyamide resin may include melt-kneading the compound represented by Chemical Formula 10 and the compound represented by Chemical Formula 11, and solidifying the melt-kneaded product to form a complex.

In the compound represented by Chemical Formula 10, X is a halogen or a hydroxyl group. Preferably, in Chemical Formula 10, X is chlorine. Specific examples of the compound represented by Chemical Formula 10 may include terephthaloyl chloride or terephthalic acid.

The compound represented by Chemical Formula 10 may form a repeat unit represented by Chemical Formula 1 by an amidation reaction of an aromatic diamine monomer. Due to the linear molecular structure, the chain packing and alignment can be kept constant in the polymer, and the surface hardness and mechanical properties of the polyamide film can be improved.

In the compound represented by Chemical Formula 11, X is a halogen or a hydroxyl group. Preferably, in Chemical Formula 11, X is chlorine. Specific examples of the compound represented by Chemical Formula 11 include phthaloyl chloride, phthalic acid, isophthaloyl chloride, or isophthalic acid.

The compound represented by Chemical Formula 11 may form a repeat unit represented by Chemical Formula 2 by an amidation reaction of an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as the repeat unit represented by Chemical Formula 2 derived from the compound represented by Chemical Formula 11 is included in the polyamide resin together with the repeat unit represented by Chemical Formula 1, the molecular weight of the polyamide resin can be increased.

Meanwhile, in the step of melt-kneading the compound represented by Chemical Formula 10 and the compound represented by Chemical Formula 11, and solidifying the melt-kneaded product to form a complex, the melt-kneading means mixing the compound represented by Chemical Formula 10 and the compound represented by Chemical Formula 11 at a temperature equal to or higher than the melting point.

In this manner, the compound represented by Chemical Formula 10 and the compound represented by Chemical Formula 11 are not simply physically mixed, but through the formation of a complex by melt-kneading at a temperature higher than each melting point, each monomer can be induced to react relatively evenly with the aromatic diamine monomer.

Due to the difference in the solubility of the compound represented by Chemical Formula 10 and the compound represented by Chemical Formula 11, it is possible to overcome the limit that the amide repeat unit derived from the compound represented by Chemical Formula 10 is predominantly formed and long blocks are formed, thereby increasing the crystallinity of the polyamide resin and making it difficult to secure transparency, and further, the first polyamide segment and the second polyamide segment can form an alternating backbone chain containing an alternating repeat unit represented by Chemical Formula 3 as in one embodiment.

At this time, with respect to 100 parts by weight of the compound represented by Chemical Formula 10, the compound represented by Chemical Formula 11 may be mixed in an amount of 5 parts by weight to 60 parts by weight, or 5 parts by weight to 50 parts by weight, or 5 parts by weight to 25 parts by weight, or 10 parts by weight to 30 parts by weight, or 15 parts by weight to 25 parts by weight. Thereby, the technical effect of increasing transmittance and clarity can be realized. When the compound represented by Chemical Formula 11 is mixed in an excessively small amount of less than 5 parts by weight with respect to 100 parts by weight of the compound represented by Chemical Formula 10, the technical problems such as becoming opaque and the increase of haze may occur. When the compound represented by Chemical Formula 11 is mixed in an excessively high amount of more than 60 parts by weight with respect to 100 parts by weight of the compound represented by Chemical Formula 10, the technical problems such as the reduction of physical properties (hardness, tensile strength, etc.) may occur.

In addition, in forming the complex by solidifying the molt-kneaded product, the solidifying means a physical change in which the molt-kneaded product in a molten state is cooled to a temperature equal to or less than the melting point and solidified. Thereby, the formed complex may be in a solid state. More preferably, the complex may be a solid powder obtained through an additional grinding process or the like.

Meanwhile, the step of melt-kneading a compound represented by Chemical Formula 10 and a compound represented by Chemical Formula 11, and solidifying the melt-kneaded product to form a complex may include a step of mixing the compound represented by Chemical Formula 10 and the compound represented by Chemical Formula 11 at a temperature of 50° C. or higher; and a step of cooling the result of the mixing step.

The terephthaloyl chloride has a melting point of 81.3° C. to 83° C., the isophthaloyl chloride has a melting point of 43° C. to 44° C., and the phthaloyl chloride may have a melting point of 6° C. to 12°C. Thereby, when these are mixed at a temperature of 50° C. or higher, or 90° C. or higher, or 50° C. to 120° C., or 90° C. to 120° C., or 95° C. to 110° C., or 100° C. to 110° C., it becomes the condition of temperature higher than the melting point of both the compound represented by Chemical Formula 10 and the compound represented by Chemical Formula 11 and thus, the melt-kneading may be proceeded.

In the step of cooling the result of the mixing step, the result of the melt-kneading step is left at 5° C. or below, or minus 10° C. to 5° C., or minus 5° C. to 5° C., and thus becomes a temperature condition lower than the melting point of both the compound represented by Chemical Formula 10 and the compound represented by Chemical Formula 11, so that a more uniform solid powder can be obtained through cooling.

Meanwhile, after the step of cooling the result of the mixing step, the method may further include a step of grinding the result of the cooling step. Through the grinding step, a solid complex can be prepared in powder form, and the powder obtained after the grinding step may have an average particle size of 1 mm to 10 mm.

Grinders used for grinding with such particle sizes specifically include a pin mill, a hammer mill, a screw mill, a roll mill, a disc mill, a jog mil or sieve, a jaw crusher, and the like, but are not limited to the examples described above.

In this manner, as the melt mixture of the compound represented by Chemical Formula 10 and the compound represented by Chemical Formula 11 is reacted with the aromatic diamine monomer in the form of solids, specifically solid powders, through the cooling at a temperature lower than the melting point, the deterioration of the compound represented by Chemical Formula 10 and the compound represented by Chemical Formula 11 due to moisture or their mixing in solvents is minimized, the molecular weight of the finally synthesized polyamide resin is increased, and thereby excellent mechanical properties of the polyamide resin can be ensured.

In addition, after the step of melt-kneading a compound represented by Chemical Formula 10 and a compound represented by Chemical Formula 11, and solidifying the melt-kneaded product to form a complex, the method for preparing the polyamide resin may include a step of reacting the complex with an aromatic diamine monomer.

The reaction in the step of reacting the complex with an aromatic diamine monomer may be performed under an inert gas atmosphere at a temperature condition of minus 25° C. to plus 25° C., or a temperature condition of minus 25° C. to 0° C.

Specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4- aminophenoxy)phenyl]propane, 1,3-bis(4-aminophenoxy) benzene, m-xylylenediamine, p-xylylenediamine and 4,4'-diaminobenzanilide.

More preferably, as the aromatic diamine monomer, 2,2'-bis(trifluoromethyl)-4,4'-biphenyldiamine (TFDB), 2,2'-dimethyl-4,4'-diaminobenzidine, m-xylylenediamine, or p-xylylenediamine can be used.

More specifically, the step of reacting the complex with an aromatic diamine monomer may include a step of dissolving the aromatic diamine monomer in an organic solvent to prepare a diamine solution; and a step of adding a complex powder to the diamine solution.

In the step of dissolving the aromatic diamine monomer in an organic solvent to prepare a diamine solution, the aromatic diamine monomer contained in the diamine solution may be present in a state dissolved in an organic solvent. Examples of the solvent are not particularly limited, but for example, common general-purpose organic solvents such as N-methylformamide, N,N-dimethylformamide, N,N-diethylformamide, N,N-dimethylacetamide, N,N-diethylacetamide, N,N-dimethylpropionamide, 3-methoxy-N,N-dimethylpropionamide, dimethyl sulfoxide, acetone, N-methyl-2-pyrrolidone, N-ethyl-2-pyrrolidone, N-cyclohexyl-2-pyrrolidone, N-octyl-2-pyrrolidone, tetrahydrofuran, chloroform, gamma-butyrolactone, ethyl lactate, methyl 3-methoxypropionate, methyl isobutyl ketone, toluene, xylene, methanol, ethanol, or the like can be used without limitation.

In the step of adding a complex powder to the diamine solution, the complex powder will react with the aromatic diamine monomer dissolved in the diamine solution. As a result, the deterioration of the compound represented by Chemical Formula 10 and the compound represented by Chemical Formula 11 due to moisture, or their mixing in solvents is minimized, and the molecular weight of the finally synthesized polyamide resin is increased, so that excellent mechanical properties of the polyamide resin can be ensured.

After the step of cooling the result of the mixing step, the complex powder can prepare a complex of solids into powder form through the step of grinding the result of the cooling step. The powder obtained after the grinding step may have an average particle size of 1 mm to 10 mm.

The molar ratio between the complex and the aromatic diamine monomer is not largely limited, and for example, the reaction may be performed at a molar ratio of 50:100 to 150:100, or 95:100 to 110:100.

Meanwhile, the polymer resin composition may further include at least one selected from the group consisting of a metal salt compound and an end-capping agent compound. That is, the polymer resin composition may include one of one metal salt compound, one end-capping agent compound, or a mixture of the metal salt compound and the end-capping agent.

The metal salt compound may exist in a dispersion state on the polyamide resin matrix contained in the polymer resin composition.

The metal salt compound may include an alkali metal salt or an alkaline earth metal salt. The alkali metal salt or alkaline earth metal salt means a salt containing an alkali metal or alkaline earth metal and an anion corresponding thereto.

As the alkali metal, any one selected from lithium, sodium, potassium, rubidium and cesium, or a mixture thereof, may be used, and as the alkaline earth metal, any one selected from beryllium, magnesium, calcium, strontium, and barium, or a mixture thereof may be used.

The alkali metal salt or alkaline earth metal salt may include any one or more selected from the group consisting of organic carboxylates of alkali metals or alkaline earth metals, alkoxy salts of alkali metals or alkaline earth metals, oxalates of alkali metals or alkaline earth metals, phenoxy salts of alkali metals or alkaline earth metals, organic sulfonates of alkali metals or alkaline earth metals, organic phosphonic acid salts of alkali metals or alkaline earth metals, sulfonates of alkali metals or alkaline earth metals, phosphates of alkali metals or alkaline earth metals, carbonates of alkali metals or alkaline earth metals, halogen salts of alkali metal or alkaline earth metal, and nitrates of alkali metals or alkaline earth metals.

When the alkali metal salt and alkaline earth metal salt are at least one selected from organic carboxylate, alkoxy salt, phenoxy salt, organic sulfonate, and organic phosphonate, each of them may contain any one or more functional groups selected from an aliphatic hydrocarbon chain, an aromatic hydrocarbon ring, or an aromatic heterocyclic group.

In this case, the chain of the aliphatic hydrocarbon is an alkyl group having 1 to 30 carbon atoms, and the aromatic hydrocarbon ring is an aryl group having 6 to 40 carbon atoms, and the aromatic heterocyclic group is a heteroaryl group having 2 to 40 carbon atoms, and the carboxylate, alkoxy salt, organic sulfonate, organic phosphate of alkali metals or alkaline earth metals, and the like may include any one or more functional groups selected from an alkyl group having 1 to 30 carbon atoms as a chain of an aliphatic hydrocarbon, an aryl group having 6 to 40 carbon atoms as an aromatic hydrocarbon ring, or a heteroaryl group having 2 to 40 carbon atoms as an aromatic heterocyclic group.

Specific examples of the metal salt compound may include at least one compound selected from the group consisting of lithium chloride (LiCl), calcium chloride ($CaCl_2$)), magnesium chloride ($MgCl_2$), sodium chloride (NaCl), and potassium chloride (KCl).

Each of the alkali metal salt or alkaline earth metal salt may include a salt in the form of a hydrate. In this case, the alkali metal salt or alkaline earth metal salt each consists of only a salt in the form of a hydrate, or may be composed of a mixture of anhydrous metal salt and a hydrate form in which the hydrate form consists of 30 wt. % or more, 50 wt. % or more, or 70 wt. % or more.

Meanwhile, the polymer resin composition of one embodiment has a relative viscosity of 100 KcP or less, or 70 KcP or less, or 10 KcP or more and 100 KcP or less, or 10 KcP or more and 70 KcP or less, or 50 KcP or more and 100 KcP or less, or 50 KcP or more and 70 KcP or less, or 10 KcP or more and 30 KcP or less, or 10 KcP or more and 20 KcP or less. The relative viscosity measurement can be performed according to the test method prescribed in ASTM D 2196.

Specifically, the relative viscosity of the polymer resin composition containing the metal salt compound may be 100 KcP or less, or 70 KcP or less, or 10 KcP or more and 100 KcP or less, or 10 KcP or more and 70 KcP or less, or 50 KcP or more and 100 KcP or less, or 50 KcP or more and 70 KcP or less, or 10 KcP or more and 30 KcP or less, or 10 KcP or more and 20 KcP or less. More specifically, the relative viscosity may be a value measured for a polymer resin composition that satisfies the temperature condition of room temperature (20° C. or more and 30° C. or less). In order to maintain the above temperature conditions, for example, a constant reflux system at 25±0.2° C. may be used.

The polymer resin composition may further include an organic solvent. As a specific example of the organic solvent, for example, common general-purpose organic solvents, such as N-methylformamide, N,N-dimethylformamide (DMF), N,N-diethylformamide, N,N-dimethylacetamide (DMAc), N,N-diethylacetamide, N,N-dimethylpropionamide, 3-methoxy-N,N-dimethylpropionamide, dimethyl sulfoxide (DMSO), acetone, N-methyl-2-pyrrolidone (NMP), N-ethyl-2-pyrrolidone, N-cyclohexyl-2-pyrrolidone, N-octyl-2-pyrrolidone, tetrahydrofuran, chloroform, gamma-butyrolactone (GBL), ethyl lactate, methyl 3-methoxypropionate, methyl isobutyl ketone, methyl ethyl ketone (MEK), toluene, xylene, methanol, ethanol, diphenylamine (DPA), and the like can be used without limitation.

The content of the polyamide resin in the polymer resin composition further containing the organic solvent may be 1 wt. % or more and 30 wt. % or less, or 1 wt. % or more and 20 wt. % or less, or 1 wt. % or more and 10 wt. % or less, or 4 wt. % or more and 9 wt. % or less. When the relative viscosity of the polymer resin composition in which the content of the polyamide resin in the polymer resin composition further containing the organic solvent is 1 wt. % or more and 30 wt. % or less is excessively increased by more than 100 KcP, the efficiency of the film forming process is significantly reduced as gelation progresses, and it may be difficult to secure optical transparency of the obtained film.

That is, in the polymer resin composition of one embodiment, the relative viscosity of the polymer resin composition in which the solid content of the polyamide resin is 1 wt. % or more and 30 wt. % or less may be 100 KcP or less, or 70 KcP or less, or 10 KcP or more and 100 KcP or less, or 10 KcP or more and 70 KcP or less, or 50 KcP or more and 100 KcP or less, or 50 KcP or more and 70 KcP or less, or 10 KcP or more and 30 KcP or less, or 10 KcP or more and 20 KcP or less.

Further, the relative viscosity may be a value measured for the polymer resin composition satisfying the solid content of the polyamide resin which is 1 wt. % or more and 30 wt. % or less, or 1 wt. % or more and 20 wt. % or less, or 1 wt. % or more and 10 wt. % or less, or 4 wt. % or more and 9 wt. % or less. For example, the solid content of the polymer resin composition can be adjusted by adding an organic solvent, an aqueous solvent (water), or a mixture thereof.

That is, in the polymer resin composition, the relative viscosity of the polymer resin composition in which the solid content of the polyamide resin is 1 wt. % or more and 30 wt. % or less, or 1 wt. % or more and 20 wt. % or less, or 1 wt. % or more and 10 wt. % or less, or 4 wt. % or more and 9 wt. % or less may be 100 KcP or less, or 70 KcP or less, or 10 KcP or more and 100 KcP or less, or 10 KcP or more and 70 KcP or less, or 50 KcP or more and 100 KcP or less, or 50 KcP or more and 70 KcP or less, or 10 KcP or more and 30 KcP or less, or 10 KcP or more and 20 KcP or less.

For example, in the polymer resin composition, the relative viscosity of the polymer resin composition in which the solid content of the polyamide resin is 1 wt. % or more and 20 wt. % or less may be 100 KcP or less.

Meanwhile, the end-capping agent compound may exist in a dispersion state on the polyamide resin matrix contained in the polymer resin composition.

The end-capping agent compound may be added in an amount of 0.1 parts by weight or more and 20 parts by weight or less based on 100 parts by weight of the polyamide resin.

The end-capping agent compound may include at least one selected from the group consisting of a monoamine compound, a monoacyl halide compound, and a monoacid anhydride compound. That is, the end-capping agent compound may include one monoamine compound, one monoacyl halide compound, one monoacid anhydride compound, a mixture of one monoamine compound and one monoacyl halide compound, a mixture of one monoacyl halide compound and one monoacid anhydride compound, a mixture of one monoamine compound and one monoacid anhydride compound, or a mixture of one monoamine compound, one monoacyl halide compound, and one monoacid anhydride compound.

Some of the end-capping agent compound contained in the polymer resin composition can react with a terminal functional group of the polyamide resin, or the rest can exist in a dispersion state on the polyamide resin matrix without reacting with the functional group, depending on the type of terminal functional group of the polyamide resin contained in the polymer resin composition.

For example, when the terminal functional group of the polyamide resin contained in the polymer resin composition is an amino group, the monoamine compound exists in a dispersed state without reacting with the amino group, and the monoacyl halide compound and the monoacid anhydride compound can react with the amino group.

Further, when the terminal functional group of the polyamide resin contained in the polymer resin composition is an acyl chloride group, the monoacyl halide compound or the monoacid anhydride compound exist in a dispersed state without reacting with the acyl chloride group, and the monoamine compound may react with an acyl chloride group.

Specifically, the monoamine compound may include a compound represented by the following Chemical Formula 5.

$$R_1\text{—}NH_2 \quad \text{[Chemical Formula 5]}$$

in Chemical Formula 5, $R_1$ is one of an alkyl group having 1 to 20 carbon atoms, an alkenyl group having 2 to 20 carbon atoms, a cycloalkyl group having 3 to 20 carbon atoms, or an aryl group having 6 to 30 carbon atoms. Each of the alkyl group having 1 to 20 carbon atoms, the alkenyl group having 2 to 20 carbon atoms, the cycloalkyl group having 3 to 20 carbon atoms, and the aryl group having 6 to 30 carbon atoms may be substituted or unsubstituted, and examples of the substituents are the same as described above.

Specifically, in Chemical Formula 5, $R_1$ may be one of a methyl group, an ethyl group, a propyl group, an isopropyl group, a tert-butyl group, a cyclohexyl group, a phenyl group, a methylphenyl group, a 3,5-bis(trifluoromethyl)-1-phenyl group, a 4-phenyl-1-phenyl group, a 4-methylphenyl-1-phenyl group, a 4-phenyl-1-methylphenyl group, a 4-methylphenyl-1-methylphenyl group, a 3-phenyl-1-phenyl group, a 3-methylphenyl-1-phenyl group, a 3-phenyl-1-methylphenyl group, or a 3-methylphenyl-1-methylphenyl group.

Specific examples of the compound represented by Chemical Formula 5 may include any one of compound groups represented by the following Chemical Formula 5-1.

[Chemical Formula 5-1]

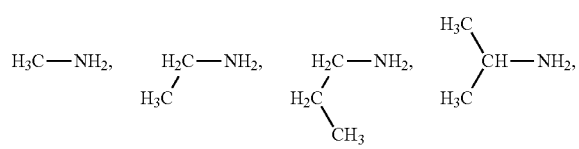

-continued

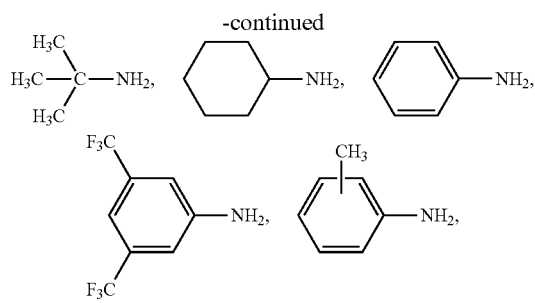

Meanwhile, the monoacyl halide compound may include a compound represented by the following Chemical Formula 6.

[Chemical Formula 6]

R₂—C(=O)—X in Chemical Formula 6, $R_2$ is one of an alkyl group having 1 to 20 carbon atoms, an alkenyl group having 2 to 20 carbon atoms, a cycloalkyl group having 3 to 20 carbon atoms, or an aryl group having 6 to 30 carbon atoms, and X is halogen. Each of the alkyl group having 1 to 20 carbon atoms, the alkenyl group having 2 to 20 carbon atoms, the cycloalkyl group having 3 to 20 carbon atoms, or the aryl group having 6 to 30 carbon atoms may be substituted or unsubstituted, and examples of the substituent are as described above.

Specifically, in Chemical Formula 6, $R_2$ may be one of a methyl group, an ethyl group, a propyl group, an isopropyl group, a tert-butyl group, a cyclohexyl group, a phenyl group, a methylphenyl group, a 3,5-bis(trifluoromethyl)-1-phenyl group, and X is chlorine.

Specific examples of the compound represented by Chemical Formula 6 may include any one of compound groups represented by the following Chemical Formula 6-1.

[Chemical Formula 6-1]

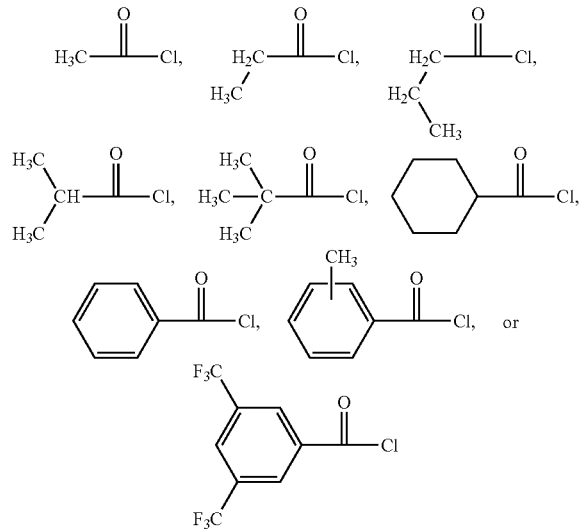

Meanwhile, the monoacid anhydride compound may include a compound represented by the following Chemical Formula 7.

[Chemical Formula 7]

in Chemical Formula 7, $R_3$ is one of an alkylene group having 1 to 20 carbon atoms, an alkenylene group having 2 to 20 carbon atoms, a cycloalkylene group having 3 to 20 carbon atoms, a cycloalkenylene group having 3 to 20 carbon atoms, or an arylene group having 6 to 30 carbon atoms.

Each of the alkylene group having 1 to 20 carbon atoms, the alkenylene group having 2 to 20 carbon atoms, the cycloalkylene group having 3 to 20 carbon atoms, the cycloalkenylene group having 3 to 20 carbon atoms, or the arylene group having 6 to 30 carbon atoms may be substituted or unsubstituted, and examples of the substituent are as described above.

Specifically, in Chemical Formula 7, $R_3$ may be one of an ethylene group, a 1-methylethylene group, a 1,2-dimethylethylene group, an ethenylene group, a 1-methylethylene group, a 1,2-dimethylethenylene group, a cyclohexylene group, a cyclohexenylene group, a bicyclo[2,2,1]heptylene group, a norbornylene group, a phenylene group, a methylphenylene group, or a dimethylphenylene group.

Specific examples of the compound represented by Chemical Formula 7 may include any one of compound groups represented by the following Chemical Formula 7-1.

[Chemical Formula 7-1]

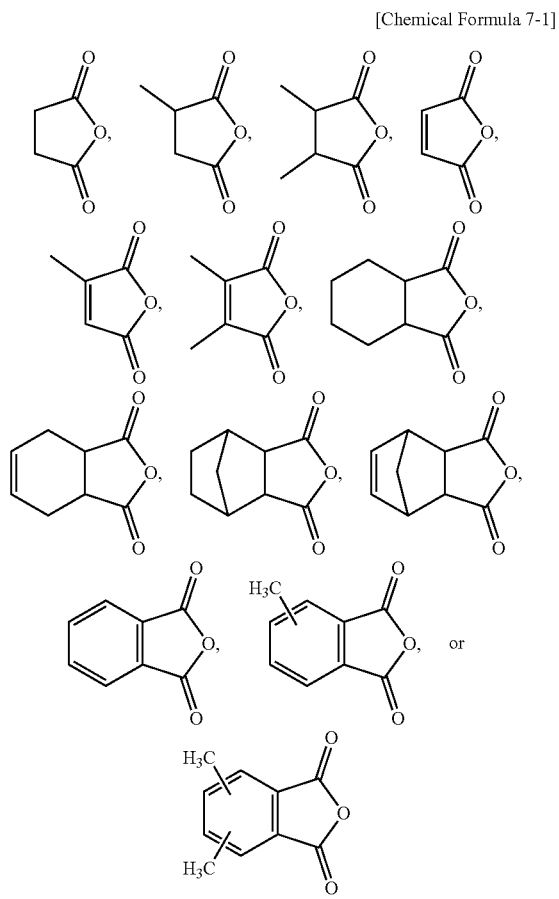

The polymer resin composition may have a viscosity change rate according to the following Mathematical Formula 1 of 5% or less, or 0.10% or more and 5% or less, or 0.10% or more and 3% or less, or 0.10% or more and 2% or less. Specifically, the viscosity change rate according to the following Mathematical Formula 1 of the polymer resin composition containing the end-capping agent compound may be 5% or less, or 0.10% or more and 5% or less, or 0.10% or more and 3% or less, or 0.10% or more and 2% or less.

[Mathematical Formula 1]

Viscosity change rate (%)=Absolute value of (Viscosity of polymer resin composition after storage at room temperature for 24 hours−Viscosity of polymer resin composition before storage at room temperature for 24 hours)/Viscosity of polymer resin composition before storage at room temperature for 24 hours*100.

That is, the polymer resin composition may further include an organic solvent. As a specific example of the organic solvent, for example, common general-purpose organic solvents such as N-methylformamide, N,N-dimethylformamide (DMF), N,N-diethylformamide, N,N-dimethylacetamide (DMAc), N,N-diethylacetamide, N,N-dimethylpropionamide, 3-methoxy-N,N-dimethylpropionamide, dimethyl sulfoxide (DMSO), acetone, N-methyl-2-pyrrolidone, N-ethyl-2-pyrrolidone, N-cyclohexyl-2-pyrrolidone, N-octyl-2-pyrrolidone, tetrahydrofuran, chloroform, gamma-butyrolactone (GBL), ethyl lactate, methyl 3-methoxypropionate, methyl isobutyl ketone, methyl ethyl ketone (MEK), toluene, xylene, methanol, ethanol, or diphenyl amine (DPA) can be used without limitation.

The content of the polyamide resin in the polymer resin composition further containing the organic solvent may be 1 wt. % or more and 30 wt. % or less, or 1 wt. % or more and 20 wt. % or less, or 1 wt. % or more and 15 wt. % or less, or 5 wt. % or more and 15 wt. % or less More specifically, the viscosity is a relative viscosity measured for a polymer resin composition having a solid content of 5 wt. % or more and 15 wt. % or less. In a more specific example of the relative viscosity measurement method, the solid content of the polymer resin composition is adjusted to 8 wt. % using a dimethylacetamide (DMAc) solvent, and then the relative viscosity is measured according to ASTM D 2196: test method of non-Newtonian materials by Brookfield DV-2T Rotational Viscometer, in which as the reference material of Brookfield silicone standard oil, a number of standard solutions having a viscosity range of 5000 cps to 200000 cps is used, and the measurement can be performed with a spindle LV-4 (64), 0.3-100 RPM.

When the viscosity change rate of the polymer resin composition according to Mathematical Formula 1 increases excessively by more than 5%, there is a limit in that storage stability decreases due to a change in viscosity during long-term storage in the process of synthesizing the polymer resin using the polymer resin composition.

The polymer resin composition may further include an organic solvent, water, and other additives, and examples of the organic solvent are as described above.

2. Polymer Film

According to the other embodiment of the present disclosure, there can be provided a polymer film including a cured product of the polymer resin composition of one embodiment.

The details concerning the polymer resin composition can include all of those described above in the one embodiment.

More specifically, the polymer film may include a cured product of the polymer resin composition of one embodiment. The cured product means a material obtained through a curing step of the polymer resin composition of the one embodiment. Thereby, the polyamide resin may form a matrix of the polymer film.

When the polymer film is prepared using the polymer resin composition of the one embodiment, excellent optical and mechanical properties can be realized, and at the same time, flexibility can be provided, so that it can be used as a material for various molded articles. For example, the polymer film may be applied to a display substrate, a display protective film, a touch panel, a window cover of a foldable device, and the like.

The thickness of the polymer film is not particularly limited, but for example, it can be freely adjusted within the range of 0.01 μm to 1000 μm. When the thickness of the polymer film increases or decreases by a specific value, the physical properties measured in the polymer film may also change by a certain value.

Meanwhile, the polymer film may be a polymer film including the polymer resin composition including: a polyamide resin in which an average particle size of individual crystals measured by a small-angle X-ray scattering apparatus is 8.0 nm or less; and a cured product of the polymer resin composition containing a metal salt compound.

The polymer film has a content of a metal salt compound measured using an inductively coupled plasma spectrometer, of 2000 ppm or less, or 500 ppm or less, or 300 ppm or less, or 250 ppm or less, or 0.01 ppm or more, or 0.1 ppm or more, based on 1 g or less, or 0.1 g or more and 1 g or less, or 0.4 g or more and 0.6 g or less of the polymer film.

More specifically, the polymer film has a chlorine (Cl) content measured using an inductively coupled plasma spectrometer, of 2000 ppm or less, or 500 ppm or less, or 300 ppm or less, or 250 ppm or less, or 0.01 ppm or more, or 0.1 ppm or more, based on 1 g or less, or 0.1 g or more and 1 g or less, or 0.4 g or more and 0.6 g or less of the polymer film.

Specifically, the content of the metal salt compound or the chlorine (Cl) content can be measured for a sample solution containing 1 g or less, or 0.1 g or more and 1 g or less, or 0.4 g or more and 0.6 g or less of a polymer film using an inductively coupled plasma spectrometer (ICP-OES: Optima 8300 DV, Perkin Elmer).

Examples of the measurement conditions of the inductively coupled plasma spectrometer are not particularly limited, but as an example, the measurement can be performed under the following conditions: Main column: Ion-Pac AS18 analytical (4×250 mm), Guard Column: IonPac AG18 guard (4×50 mm), Eluent type: KOH (30.5 mM), Eluent flow rate: 1 mL/min, Detector: Suppressed Conductivity Detector, Suppressor Current: 76 mA, Injection volume: 20 μl, Isocratic/Gradient conditions: Isocratic conditions.

That is, the polymer film may be a material in which a metal salt compound has been removed from the polymer resin composition of the one embodiment.

As an example of a method of removing the metal salt compound from the polymer resin composition of the one embodiment in this way, a washing step using water or an aqueous alcohol solution in the polymer resin composition of the one embodiment may be mentioned.

Specifically, for example, the polymer film can be prepared in which water or an aqueous alcohol solution is added to the polymer resin composition containing the metal salt compound of the one embodiment, and the mixture is subjected to a washing step to dissolve and remove an metal salt compound inside, thereby preparing a solution having a low metal salt compound content, and then the solution is coated onto an arbitrary support to form a film having a thickness of 40 μm or more and 60 μm or less, and the solvent is evaporated from the film and dried, thereby preparing a film having a low metal salt compound content.

If necessary, the solvent is evaporated and dried from the film, and then the film is further subjected to a washing step using water or an aqueous alcohol solution to dissolve and remove the metal salt compound inside the film, thereby preparing a film having a lower metal salt compound content.

In another example, the polymer resin composition containing the metal salt compound of the one embodiment is coated onto an arbitrary support to form a film having a thickness of 5 μm or more and 40 μm or less, and the solvent is evaporated and dried from the film, and then subjected to a washing step using water or an aqueous alcohol solution to dissolve and remove the metal salt compound inside the film, thereby preparing a film having a low metal salt compound content.

A specific example of the aqueous alcohol solution is not limited, but for example, an aqueous alcohol solution in which alcohol and water are mixed in a ratio of 1:1 to 1:5, or 1:2 to 1:4 may be mentioned, and as an example of the alcohol, methanol, ethanol, or the like may be used in various types.

The step of coating the polymer resin composition obtained in the one embodiment onto an arbitrary support to form a film may be performed by a conventional film production method such as a dry method or a wet method. If necessary, the polymer resin composition obtained in the one embodiment can be subjected to a solid content precipitation step and a drying step to produce a polymer resin powder, and then the polymer resin powder can be re-dissolved in a solvent, followed by coating.

Meanwhile, the polymer film may be a polymer film including the polymer resin composition including: a polyamide resin in which an average particle size of individual crystals measured by a small-angle X-ray scattering apparatus is 8.0 nm or less; and a cured product of the polymer resin composition containing an end-capping agent compound.

More specifically, the polymer film may include a polymer resin composite including a polymer resin composite or a cured product thereof, including: a polyamide resin in which an average particle size of individual crystals measured by a small-angle X-ray scattering apparatus is 8.0 nm or less; and an amide-based or imide-based end-capping functional group bonded to at least one end of the backbone chain contained in the polyamide resin. The cured product means a material obtained through a curing step of the polyamide resin composition of the other embodiment.

The details concerning the polyamide resin may include all of those described above in the one embodiment, In the polymer resin composite, the amide-based or imide-based end-capping functional group may be bonded to at least one end of the backbone chain contained in the polyamide resin. That is, the polymer resin composite may be a binding material in which one end or both ends of a polyamide resin and an amide-based or imide-based end-capping functional group are bonded to each other via a chemical covalent bond.

The amide-based end-capping functional group is a functional group derived from the reaction product of the polyamide resin and the end-capping agent compound of the one embodiment, which is a monovalent functional group having an amide structure in the molecule. Specific examples thereof may include one or more functional groups selected from the group consisting of a functional group represented by the following Chemical Formula 12, a functional group represented by the following Chemical Formula 13, and a functional group represented by the following Chemical Formula 14.

[Chemical Formula 12]

$$R_4-\underset{H}{N}-\overset{O}{\underset{\|}{C}}-*$$

in Chemical Formula 12, $R_4$ is one of an alkyl group having 1 to 20 carbon atoms, an alkenyl group having 2 to 20 carbon atoms, a cycloalkyl group having 3 to 20 carbon atoms, or an aryl group having 6 to 30 carbon atoms.

More specifically, the functional group represented by Chemical Formula 12 is a functional group derived from the reaction product of the monoamine compound and the polyamide resin of the one embodiment, and the details concerning $R_4$ in Chemical Formula 12 may include all of those described above in $R_1$ in Chemical Formula 5 of the one embodiment.

[Chemical Formula 13]

in Chemical Formula 13, $R_5$ is one of an alkyl group having 1 to 20 carbon atoms, an alkenyl group having 2 to 20 carbon atoms, a cycloalkyl group having 3 to 20 carbon atoms, or an aryl group having 6 to 30 carbon atoms.

More specifically, the functional group represented by Chemical Formula 13 is a functional group derived from the reaction product of the monoacyl halide compound and the polyamide resin according to the one embodiment, and the details concerning $R_5$ in Chemical Formula 13 may include all of those described above in $R_2$ of Chemical Formula 6 of the one embodiment.

[Chemical Formula 14]

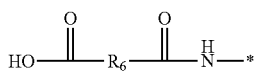

in Chemical Formula 14, $R_6$ is one of an alkylene group having 1 to 20 carbon atoms, an alkenylene group having 2 to 20 carbon atoms, a cycloalkylene group having 3 to 20 carbon atoms, a cycloalkenylene group having 3 to 20 carbon atoms, or an arylene group having 6 to 30 carbon atoms.

More specifically, the functional group represented by Chemical Formula 14 is a functional group derived from the reaction product of the monoacid anhydride compound and the polyamide resin of the one embodiment, and the details concerning $R_6$ in Chemical Formula 14 may include all of those described above in $R_3$ in Chemical Formula 7 of the one embodiment.

Further, the imide-based end-capping functional group is a functional group derived from the reaction product of the polyamide resin and the end-capping agent compound of the one embodiment, which is a monovalent functional group having an imide structure in the molecule, and specifically may include a functional group represented by the following Chemical Formula 15.

[Chemical Formula 15]

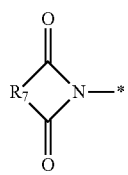

in Chemical Formula 15, $R_7$ is one of an alkylene group having 1 to 20 carbon atoms, an alkenylene group having 2 to 20 carbon atoms, a cycloalkylene group having 3 to 20 carbon atoms, a cycloalkenylene group having 3 to 20 carbon atoms, or an arylene group having 6 to 30 carbon atoms.

The amide-based or imide-based end-capping functional group may be bonded to one end or both ends of the backbone chain contained in the polyamide resin. For example, when the repeat unit represented by Chemical Formula 1 is located at the end of the backbone chain contained in the polyamide resin, the repeat unit of Chemical Formula 1 and the amide-based end-capping functional group of Chemical Formula 12 may be bonded to form a terminal structure represented by the following Chemical Formula 16.

[Chemical Formula 16]

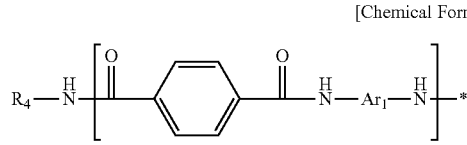

Further, the repeat unit of Chemical Formula 1 and the amide-based end-capping functional group of Chemical Formula 13 may be bonded to form a terminal structure represented by the following Chemical Formula 17.

[Chemical Formula 17]

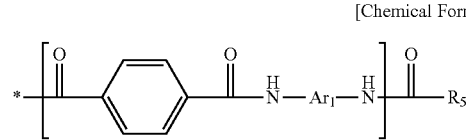

Further, the repeat unit of Chemical Formula 1 and the amide-based end-capping functional group of Chemical Formula 14 may be bonded to form a terminal structure represented by the following Chemical Formula 18.

[Chemical Formula 18]

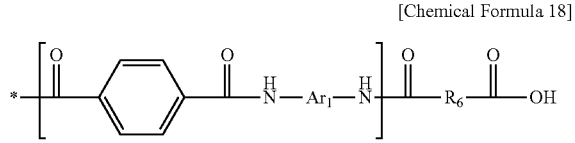

Further, the repeat unit of Chemical Formula 1 and the imide-based end-capping functional group of Chemical Formula 15 may be bonded to form a terminal structure represented by the following Chemical Formula 19.

[Chemical Formula 19]

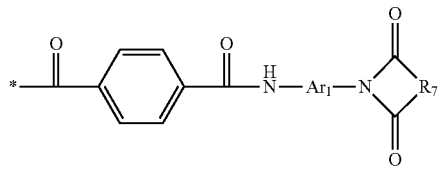

That is, the polymer resin composite may include a reaction product of a polyamide resin and an end-capping agent compound contained in the polymer resin composition of the one embodiment. The details concerning the polyamide resin and the end-capping agent compound may include all those described above in the one embodiment.

Specifically, the end-capping agent compound contained in the polymer resin composition may react to form a bond depending on the type of terminal functional group of the polyamide resin. The polyamide resin may include an amino group or an acyl chloride group as a terminal functional group, depending on the molar ratio between the acyl chloride and the amine used for synthesis. For example, both ends of the polyamide resin may be an amino group, both ends may be acyl chloride groups, or one end may be an amino group and another end may be an acyl chloride group.

When the terminal functional group of the polyamide resin is an amino group, a monoacyl halide compound may react to form an amide bond, or a monoacid anhydride compound may react to form an amide bond.

Further, when the terminal functional group of the polyamide resin is an acyl chloride group, the monoamine compound can react to form an amide bond.

As the polymer film is produced using the polyamide resin contained in the polymer resin composition of the one embodiment, it may exhibit excellent mechanical properties while being colorless and transparent.

Specifically, the polymer film has a haze value measured for a specimen having a thickness of 20 µm or more and 60 µm or less according to ASTM D1003, of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.56% to 0.97%, or 0.70% to 1.0%, or 0.74% to 0.93%. When the haze the polymer film measured according to ASTM D1003 is increased by more than 3.0%, the opacity is increased and thus it is difficult to secure a sufficient level of transparency.

Further, the polymer film has a yellow index (YI) measured for a specimen having a thickness of 20 µm or more and 60 µm or less according to ASTM E313 of 4.0 or less, or 3.0 or less, or 0.5 to 4.0, or 0.5 to 3.0, or 3.17 to 3.44. When the yellow index (YI) of the polymer film measured according to ASTM E313 is increased by more than 4.0, the opacity is increased, and thus it is difficult to secure a sufficient level of transparency.

Further, the polymer film may have a transmittance (T, @550 nm) for visible light at wavelength of 550 nm for a specimen having a thickness of 20 µm or more and 60 µm or less of 86% or more, or 86% to 90%. The transmittance (T, @388 nm) for ultraviolet light at wavelength of 388 nm may be 50.00% or more, or 60.00% or more, or 70% or more, or 70% or more and 90% or less, or 50.00% or more and 90.00% or less.

Further, the polymer film may have a folding endurance measured for a specimen having a thickness of 20 µm or more and 60 µm or less (the number of reciprocating bending cycles at an angle of 135°, a rate of 175 rpm, a radius of curvature of 0.8 mm and a load of 250 g) of 4000 cycles or more, or 7000 cycles or more, or 9000 cycles or more.

Further, the polymer film may have a pencil hardness value measured for a specimen having a thickness of 20 µm or more and 60 µm or less according to ASTM D3363 of 1H or more, or 2H or more, or 1H to 4H, or 2H to 4H.

III. Resin Laminate

According to another aspect of the present disclosure, there can be provided a resin laminate including: a substrate including the polymer film of the other embodiment; and a hard coating layer formed on at least one side of the substrate.

The substrate may include the polyamide resin of one embodiment, and it may also include a polymer film of the other embodiment. The details concerning the polyamide resin may include all of those described above in the one embodiment, and the details concerning the polymer film may include all of those described in the other embodiment.

A hard coating layer may be formed on at least one side of the substrate. A hard coating layer may be formed on one side or both sides of the substrate. When the hard coating layer is formed only on one side of the substrate, a polymer film including one or more polymers selected from the group consisting of polyimide-based, polycarbonate-based, polyester-based, polyalkyl(meth)acrylate-based, polyolefin-based and polycyclic olefin-based polymers may formed on the opposite side of the substrate.

The hard coating layer may have a thickness of 0.1 µm to 100 µm.

The hard coating layer can be used without particular limitation as long as it is a material known in the field of hard coating. For example, the hard coating layer may include a binder resin of photocurable resin; and inorganic particles or organic particles dispersed in the binder resin.

The photocurable resin contained in the hard coating layer is a polymer of a photocurable compound which can cause a polymerization reaction when irradiated with light such as ultraviolet rays, and may be one conventionally used in the art. However, preferably, the photocurable compound may be a polyfunctional (meth)acrylate monomer or oligomer. At this time, it is advantageous in terms of ensuring the physical properties of the hard coating layer that the number of (meth)acrylate-based functional groups is 2 to 10, 2 to 8, or 2 to 7. Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The inorganic particles may be, for example, silica, metal atoms such as aluminum, titanium, or zinc, or oxides or nitrides thereof. Silica fine particles, aluminum oxide particles, titanium oxide particles, zinc oxide particles, and the like can be used independently of each other.

The inorganic particles may have an average radius of 100 nm or less, or 5 to 100 nm. The type of the organic particles is not limited, and for example, polymer particles having an average particle size of 10 nm to 100 µm may be used.

The resin laminate can be used as a substrate or a cover window of a display device, or the like. It has high flexibility and bending durability together with high transmittance and low haze properties, so that it can be used as a substrate or cover window of a flexible display device. That is, the display device including the resin laminate, or the flexible display device including the resin laminate may be implemented.

Advantageous Effects

According to the present disclosure, a polymer resin composition having improved processability during film formation by controlling a rapid increase in viscosity, and a polymer film and a resin laminate using the same can be provided.

In addition, according to the present disclosure, a polymer resin composition easy to control the molecular weight and having improved storage stability during long-term storage, and a polymer resin composite, a polymer film, and a resin laminate using the same can be provided.

BRIEF DESCRIPTION OF DRAWINGS

FIG. 1 shows a schematic diagram of the crystal structure of the polyamide resin obtained in (2) of Example 1.

FIG. 2 shows a 13C-NMR spectrum of the polyamide resin obtained in (2) of Example 1.

FIG. 3 shows a 13C-NMR spectrum of the polyamide resin obtained in (2) of Example 2.

Hereinafter, embodiments of the present disclosure will be described in more detail by way of examples. However, these examples are presented for illustrative purposes only, and are not intended to limit the scope of the present disclosure.

Preparation Example: Preparation of Acyl Chloride Complex

Preparation Example 1

In a 1000 mL 4-neck round flask (reactor) equipped with a stirrer, a nitrogen injector, a dropping funnel and a temperature controller, 549.4 g (2.704 mol) of terephthaloyl chloride (TPC; melting point: 83° C.) and 120.6 g (0.594 mol) of isophthaloyl chloride (IPC; melting point: 44° C.) were charged, and melt-kneaded at 100° C. for 3 hours, and then cooled at 0° C. for 12 hours to prepare a complex of acylchloride (specifically, terephthaloyl chloride and isophthaloyl chloride).

Subsequently, the acyl chloride complex was grinded with a jaw crusher to prepare a powder having an average particle size of 5 mm.

Preparation Example 2

An acylchloride complex powder was prepared in the same manner as in Preparation Example 1, except that 569.5 g (2.803 mol) of terephthaloyl chloride (TPC; melting point: 83° C.) and 100.5 g (0.495 mol) of isophthaloyl chloride (IPC; melting point: 44° C.) were added.

Example A: Preparation of Polymer Resin Composition and Polymer Film

Example 1

(1) Polymer Resin Composition

In a 500 mL 4-neck round flask (reactor) equipped with a stirrer, a nitrogen injector, a dropping funnel and a temperature controller, 234 g of N,N-dimethylacetamide (DMAc) and 8.0938 g of lithium chloride (LiCl) as a viscosity modifier were charged while slowly flowing nitrogen. Then, the temperature of the reactor was adjusted to 0° C., and then 14.1526 g (0.0442 mol) of 2,2'-bis(trifluoromethyl)-4,4'-biphenyldiamine (TFDB) was added thereto to be dissolved.

The mixture was stirred while adding 8.972 g (0.0442 mol) of the acyl chloride complex powder obtained in Preparation Example 1, and subjected to an amide formation reaction at 0° C. for 12 hours to prepare a polymer resin composition in which a solid content of the polyamide resin was 9 wt. % (w/v).

(2) Polymer Film

N,N-dimethylacetamide (DMAc) was added to the polymer resin composition, and diluted so that the solid content became 5% or less. This was precipitated with 1 L of aqueous methanol solution in which water and methanol were mixed in a volume ratio of 3:1. The precipitated solid content was filtered and then dried in a vacuum state at 100° C. for 6 hours or more to prepare a polyamide resin in the form of a solid.

It was confirmed through 13C-NMR shown in FIG. 2 below that 82 mol % of the first repeat unit obtained by the amide reaction of terephthaloyl chloride (TPC) and 2,2'-bis(trifluoromethyl)-4,4'-biphenyldiamine (TFDB), and 18 mol % of the second repeat unit obtained by the amide reaction of isophthaloyl chloride (IPC) and 2,2'-bis(trifluoromethyl)-4,4'-biphenyldiamine (TFDB) were contained in the polyamide resin obtained in (2) of Example 1.

The polyamide resin obtained in (2) of Example 1 was dissolved in N,N-dimethylacetamide to prepare a polymer solution in which a solid content of the polyamide resin was 8% (w/V).

The polymer solution was coated onto a polyimide substrate film (UPILEX-75s, UBE), and the thickness was uniformly adjusted to 50 μm using a film applicator.

Thereafter, the coated film was dried in a Mathis oven at 80° C. for 15 minutes, and then cured at 250° C. for 30 minutes while flowing nitrogen, and then the cured film was peeled from the substrate film to obtain a polymer film.

Example 2

(1) Polymer Resin Composition

A polymer resin composition was prepared in the same manner as in (1) of Example 1, except that the acyl chloride complex powder obtained in Preparation Example 2 was used instead of the acyl chloride complex powder obtained in Preparation Example 1.

(2) Polymer Film

A polyamide resin and a polymer film were prepared in the same manner as in (2) of Example 1, except that the polymer resin composition obtained in (1) of Example 2 was used instead of the polymer resin composition obtained in (1) of Example 1.

It was confirmed through 13C-NMR shown in FIG. 3 below that 85 mol % of the first repeat unit obtained by the amide reaction of terephthaloyl chloride (TPC) and 2,2'-bis(trifluoromethyl)-4,4'-biphenyldiamine (TFDB), and 15 mol % of the second repeat unit obtained by the amide reaction of isophthaloyl chloride(IPC) and 2,2'-bis(trifluoromethyl)-4,4'-biphenyldiamine(TFDB) were contained in the polyamide resin obtained in (2) of Example 2.

Example 3

(1) Polymer Resin Composition

A polymer resin composition was prepared in the same manner as in (1) of Example 1.

(2) Polymer Film

A polymer resin composition was coated onto a polyimide substrate film (UPILEX-75s, UBE), and the thickness was uniformly adjusted to 50 μm using a film applicator.

Thereafter, the coated film was dried in a Mathis oven at 80° C. for 15 minutes, and then put in deionized water to remove LiCl. The obtained film was cured at 250° C. for 30 minutes while flowing nitrogen, and then peeled from the substrate film to obtain a polymer film.

Example 4

(1) Polymer Resin Composition

In a 500 mL 4-neck round flask (reactor) equipped with a stirrer, a nitrogen injector, a dropping funnel and a temperature controller, 262 g of N,N-dimethylacetamide (DMAc)

and 23.5800 g of calcium chloride (CaCl$_2$)) as a viscosity modifier were charged while slowly flowing nitrogen. Then, the temperature of the reactor was adjusted to 0° C., and then 8.43918 g (0.02635 mol) of 2,2'-bis(trifluoromethyl)-4,4'-biphenyldiamine (TFDB) was added thereto to be dissolved.

The mixture was stirred while adding 5.34869 g (0.02635 mol) of the acyl chloride complex powder obtained in Preparation Example 1, and subjected to an amide formation reaction at 0° C. for 12 hours to prepare a polymer resin composition in which a solid content of the polyamide resin was 5 wt. % (w/v).

(2) Polymer Film

N,N-dimethylacetamide (DMAc) was added to the polymer resin composition, and diluted so that the solid content became 2% or less. This was precipitated with 1 L of aqueous methanol solution in which water and methanol were mixed in a volume ratio of 3:1. The precipitated solid content was filtered and then dried in a vacuum state at 100° C. for 6 hours or more to prepare a polyamide resin in the form of a solid.

It was confirmed through 13C-NMR shown in FIG. 2 below that 82 mol % of the first repeat unit obtained by the amide reaction of terephthaloyl chloride (TPC) and 2,2'-bis(trifluoromethyl)-4,4'-biphenyldiamine (TFDB), and 18 mol % of the second repeat unit obtained by the amide reaction of isophthaloyl chloride(IPC) and 2,2'-bis(trifluoromethyl)-4,4'-biphenyldiamine(TFDB) were contained in the synthesized polyamide resin obtained in (2) of Example 4.

The polyamide resin obtained in (2) of Example 4 was dissolved in N,N-dimethylacetamide to prepare a polymer solution in which a solid content of the polyamide resin was 8% (w/V).

The polymer solution was coated onto a polyimide substrate film (UPILEX-75s, UBE), and the thickness was uniformly adjusted to 50 μm using a film applicator.

Thereafter, the coated film was dried in a Mathis oven at 80° C. for 15 minutes, and cured at 250° C. for 30 minutes while flowing nitrogen, and then the cured film was peeled from the substrate film to obtain a polymer film.

Example 5

(1) Polymer Resin Composition

A polymer resin composition was prepared in the same manner as in (1) of Example 4, except that the acyl chloride complex powder obtained in Preparation Example 2 was used instead of the acyl chloride complex powder obtained in Preparation Example 1.

(2) Polymer Film

A polyamide resin and a polymer film were prepared in the same manner as in (2) of Example 4, except that the polymer resin composition obtained in (1) of Example 5 was used instead of the polymer resin composition obtained in (1) of Example 4.

It was confirmed through 13C-NMR shown in FIG. 3 below that 85 mol % of the first repeat unit obtained by the amide reaction of terephthaloyl chloride (TPC) and 2,2'-bis(trifluoromethyl)-4,4'-biphenyldiamine (TFDB), and 15 mol % of the second repeat unit obtained by the amide reaction of isophthaloyl chloride(IPC) and 2,2'-bis(trifluoromethyl)-4,4'-biphenyldiamine(TFDB) were contained in the polyamide resin obtained in (2) of Example 5.

Example B: Preparation of polymer resin composition and polymer film

Example 6

(1) Polyamide Resin Solution

In a 500 mL 4-neck round flask (reactor) equipped with a stirrer, a nitrogen injector, a dropping funnel and a temperature controller, 262 g of N,N-dimethylacetamide (DMAc) were charged while slowly flowing nitrogen. Then, the temperature of the reactor was adjusted to 0° C., and then 13.83564 g (0.04321 mol) of 2,2'-bis(trifluoromethyl)-4,4'-biphenyldiamine (TFDB) was added thereto to be dissolved.

The mixture was stirred while adding 9.155 g (0.0451 mol) of the acyl chloride complex powder obtained in Preparation Example 1, and subjected to an amide formation reaction at 0° C. for 12 hours.

When the molecular weight of the polyamide resin reached a certain level, 5 phr of cyclohexylamine (5 parts by weight relative to 100 parts by weight of the polyamide resin) was added as an end-capping agent to obtain a polyamide resin solution containing a polyamide resin satisfying the viscosity shown in Table 5 below.

(2) Polyamide resin

N,N-dimethylacetamide (DMAc) was added to the polyamide resin solution obtained in (1) of Example 6, and diluted so that the solid content became 5% or less. This was precipitated with 1 L of methanol, and the precipitated solid content was filtered and then dried in a vacuum state at 100° C. for 6 hours or more to obtain an end-capped polyamide resin in the form of a solid.

It was confirmed through 13C-NMR shown in FIG. 2 below that 82 mol % of the first repeat unit obtained by the amide reaction of terephthaloyl chloride (TPC) and 2,2'-bis(trifluoromethyl)-4,4'-biphenyldiamine (TFDB), and 18 mol % of the second repeat unit obtained by the amide reaction of isophthaloyl chloride(IPC) and 2,2'-bis(trifluoromethyl)-4,4'-biphenyldiamine(TFDB) were contained in the end-capped polyamide resin obtained in (2) of Example 6.

(3) Polymer Film

The polyamide resin in the form of a solid obtained in (2) of Example 6 was dissolved in N,N-dimethylacetamide to prepare a polymer solution having a solid content of 8% (w/V). The polymer solution was coated onto a polyimide substrate film (UPILEX-75s, UBE), and the thickness was uniformly adjusted using a film applicator.

Thereafter, the coated film was dried in a Mathis oven at 80°C for 15 minutes, and then cured at 250° C. for 30 minutes while flowing nitrogen, and then the cured film was peeled from the substrate film to obtain a polymer film.

Example 7

(1) Polyamide Resin Solution

A polyamide resin solution was prepared in the same manner as in (1) of Example 6, except that aniline was used instead of cyclohexylamine as the end-capping agent.

(2) Polyamide Resin

An end-capped polyamide resin was prepared in the same manner as in (2) of Example 6, except that the polyamide resin solution obtained in (1) of Example 7 was used instead of the polyamide resin solution obtained in (1) of Example 6.

(3) Polymer Film

A polymer film was prepared in the same manner as in (3) of Example 6, except that the polyamide resin obtained in (2) of Example 7 was used instead of the polyamide resin obtained in (2) of Example 6.

Example 8

(1) Polyamide Resin Solution

In a 500 mL 4-neck round flask (reactor) equipped with a stirrer, a nitrogen injector, a dropping funnel and a temperature controller, 262 g of N,N-dimethylacetamide (DMAc) were charged while slowly flowing nitrogen. Then, the temperature of the reactor was adjusted to 0° C., and then 14.04989 g (0.04387 mol) of 2,2'-bis(trifluoromethyl)-4,4'-biphenyldiamine (TFDB) was added thereto to be dissolved.

The mixture was stirred while adding 8.73272 g (0.04301 mol) of the acyl chloride complex powder obtained in Preparation Example 1, and subjected to an amide formation reaction at 0° C. for 12 hours.

When the molecular weight of the polyamide resin reached a certain level, 5 phr of 5-norbornene-2,3-dicarboxylic anhydride (5 parts by weight relative to 100 parts by weight of the polyamide resin) was added as an end-capping agent to obtain a polyamide resin solution containing a polyamide resin satisfying the viscosity shown in Table 5 below.

(2) Polyamide Resin

An end-capped polyamide resin was prepared in the same manner as in (2) of Example 6, except that the polyamide resin solution obtained in (1) of Example 8 was used instead of the polyamide resin solution obtained in (1) of Example 6.

(3) Polymer Film

A polymer film was prepared in the same manner as in (3) of Example 6, except that the polyamide resin obtained in (2) of Example 8 was used instead of the polyamide resin obtained in (2) of Example 6.

Example 9

(1) Polyamide Resin Solution

A polyamide resin solution was prepared in the same manner as in (1) of Example 8, except that maleic anhydride was used instead of 5-norbornene-2,3-dicarboxylic anhydride as the end-capping agent.

(2) Polyamide Resin

An end-capped polyamide resin was prepared in the same manner as in (2) of Example 8, except that the polyamide resin solution obtained in (1) of Example 9 was used instead of the polyamide resin solution obtained in (1) of Example 8.

(3) Polymer Film

A polymer film was prepared in the same manner as in (3) of Example 8, except that the polyamide resin obtained in (2) of Example 9 was used instead of the polyamide resin obtained in (2) of Example 8.

Example 10

(1) Polyamide Resin Solution

A polyamide resin solution was prepared in the same manner as in (1) of Example 8, except that cyclohexanecarbonyl chloride was used instead of 5-norbornene-2,3-dicarboxylic anhydride as the end-capping agent.

(2) Polyamide Resin

An end-capped polyamide resin was prepared in the same manner as in (2) of Example 8, except that the polyamide resin solution obtained in (1) of Example 10 was used instead of the polyamide resin solution obtained in (1) of Example 8.

(3) Polymer Film

A polymer film was prepared in the same manner as in (3) of Example 8, except that the polyamide resin obtained in (2) of Example 10 was used instead of the polyamide resin obtained in (2) of Example 8.

Example 11

(1) Polyamide Resin Solution

A polyamide resin solution was prepared in the same manner as in (1) of Example 8, except that benzoyl chloride was used instead of 5-norbornene-2,3-dicarboxylic anhydride as the end-capping agent.

(2) Polyamide Resin

An end-capped polyamide resin was prepared in the same manner as in (2) of Example 8, except that the polyamide resin solution obtained in (1) of Example 11 was used instead of the polyamide resin solution obtained in (1) of Example 8.

(3) Polymer Film

A polymer film was prepared in the same manner as in (3) of Example 8, except that the polyamide resin obtained in (2) of Example 11 was used instead of the polyamide resin obtained in (2) of Example 8.

Example C: Preparation of Polymer Resin Composition and Polymer Film

Example 12

(1) Polymer Resin Composition

In a 500 mL 4-neck round flask (reactor) equipped with a stirrer, a nitrogen injector, a dropping funnel and a temperature controller, 262 g of N,N-dimethylacetamide (DMAc) and 8.0938 g of lithium chloride (LiCl) as a viscosity modifier were charged while slowly flowing nitrogen. Then, the temperature of the reactor was adjusted to 0° C., and 13.83564 g (0.04321 mol) of 2,2'-bis(trifluoromethyl)-4,4'-biphenyldiamine (TFDB) was added thereto to be dissolved.

The mixture was stirred while adding 9.155 g (0.0451 mol) of the acyl chloride complex powder obtained in Preparation Example 1, and subjected to an amide formation reaction at 0° C. for 12 hours.

When the molecular weight of the polyamide resin reached a certain level, 5 phr of cyclohexylamine (5 parts by weight relative to 100 parts by weight of the polyamide resin) was added as an end-capping agent to obtain a polymer resin composition in which in a solid content of the polyamide resin was 9 wt % (w/V).

(2) Polymer Film

N,N-dimethylacetamide (DMAc) was added to the polymer resin composition, and diluted so that the solid content became 5% or less. This was precipitated with 1 L of aqueous methanol solution in which water and methanol were mixed in a volume ratio of 3:1. The precipitated solid content was filtered and then dried in a vacuum state at 100° C. for 6 hours or more to prepare a polyamide resin in the form of a solid.

It was confirmed through 13C-NMR shown in FIG. 2 below that 82 mol % of the first repeat unit obtained by the amide reaction of terephthaloyl chloride (TPC) and 2,2'-bis (trifluoromethyl)-4,4'-biphenyldiamine (TFDB), and 18 mol % of the second repeat unit obtained by the amide reaction of isophthaloyl chloride(IPC) and 2,2'-bis(trifluoromethyl)-

4,4'-biphenyldiamine(TFDB) were contained in the polyamide resin synthesized in (2) of Example 12.

The polyamide resin obtained in (2) of Example 12 was dissolved in N,N-dimethylacetamide to prepare a polymer solution in which a solid content of the polyamide resin was 8% (w/V).

The polymer solution was coated onto a polyimide substrate film (UPILEX-75s, UBE), and the thickness was uniformly adjusted to 50 μm using a film applicator.

Thereafter, the coated film was dried in a Mathis oven at 80° C. for 15 minutes, and then cured at 250° C. for 30 minutes while flowing nitrogen, and then the cured film was peeled from the substrate film to obtain a polymer film.

Comparative Example A: Preparation of Polymer Resin Composition and Polymer Film Comparative Example 1

(1) Polymer Resin Composition

A polymer resin composition was prepared in the same manner as in (1) of Example 1, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were added simultaneously to proceed an amide formation reaction, to which lithium chloride (LiCl) as the viscosity modifier was not added.

(2) Polymer Film

A polymer film was prepared in the same manner as in (2) of Example 1, except that the polymer resin composition obtained in (1) of Comparative Example 1 was used instead of the polymer resin composition obtained in (1) of Example 1.

Comparative Example 2

(1) Polymer Resin Composition

A polymer resin composition was prepared in the same manner as in (1) of Example 1, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (IPC) was added sequentially at about 5 minute intervals to proceed an amide formation reaction, to which lithium chloride (LiCl) as the viscosity modifier was not added.

(2) Polymer Film

A polymer film was prepared in the same manner as in (2) of Example 1, except that the polymer resin composition obtained in (1) of Comparative Example 2 was used instead of the polymer resin composition obtained in (1) of Example 1.

Comparative Example 3

(1) Polymer Resin Composition

A polymer resin composition was prepared in the same manner as in (1) of Example 1, except that instead of the acyl chloride complex powder obtained in Preparation Example 1, 1.615 g (0.0080 mol) of isophthaloyl chloride (IPC) was first added, and then 7.358 g (0.0362 mol) of terephthaloyl chloride (TPC) was added sequentially at about 5 minute intervals to proceed an amide formation reaction, to which lithium chloride (LiCl) as the viscosity modifier was not added.

(2) Polymer Film

A polymer resin and a polymer film were prepared in the same manner as in (2) of Example 1, except that the polymer resin composition obtained in (1) of Comparative Example 3 was used instead of the polymer resin composition obtained in (1) of Example 1.

Comparative Example 4

(1) Polymer Resin Composition

A polymer resin composition was prepared in the same manner as in (1) of Example 1, except that lithium chloride (LiCl) as the viscosity modifier was not added.

(2) Polymer Film

A polymer resin and a polymer film were prepared in the same manner as in (2) of Example 1, except that the polymer resin composition obtained in (1) of Comparative Example 4 was used instead of the polymer resin composition obtained in (1) of Example 1.

Comparative Example B: Preparation of Polyamide resin solution, polyamide resin and polymer film Comparative Example 5

(1) Polyamide Resin Solution

A polyamide resin solution was prepared in the same manner as in (1) of Example 6, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were simultaneously added to proceed an amide formation reaction, to which an end-capping agent was not added.

(2) Polyamide Resin

A polyamide resin was prepared in the same manner as in (2) of Example 6, except that the polyamide resin solution obtained in (1) of Comparative Example 5 was used instead of the polyamide resin solution obtained in (1) of Example 6.

(3) Polymer Film

A polymer film was prepared in the same manner as in (3) of Example 6, except that the polyamide resin obtained in (2) of Comparative Example 5 was used instead of the polyamide resin obtained in (2) of Example 6.

Comparative Example 6

(1) Polyamide resin solution

A polyamide resin solution was prepared in the same manner as in (1) of Example 6, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (IPC) was sequentially added at intervals of about 5 minutes to proceed an amide formation reaction, to which an end-capping agent was not added.

(2) Polyamide resin

A polyamide resin was prepared in the same manner as in (2) of Example 6, except that the polyamide resin solution obtained in (1) of Comparative Example 6 was used instead of the polyamide resin solution obtained in (1) of Example 6.

(3) Polymer Film

A polymer film was prepared in the same manner as in (3) of Example 6, except that the polyamide resin obtained in (2) of Comparative Example 6 was used instead of the polyamide resin obtained in (2) of Example 6.

Comparative Example 7

(1) Polyamide resin solution

A polyamide resin solution was prepared in the same manner as in (1) of Example 6, except that instead of the acyl chloride complex powder obtained in Preparation Example 1, 1.615 g (0.0080 mol) of isophthaloyl chloride (IPC) was first added, and then 7.358 g (0.0362 mol) of terephthaloyl chloride (TPC) was sequentially added at intervals of about 5 minutes to proceed an amide formation reaction, to which an end-capping agent was not added.

(2) Polyamide resin

A polyamide resin was prepared in the same manner as in (2) of Example 6, except that the polyamide resin solution obtained in (1) of Comparative Example 7 was used instead of the polyamide resin solution obtained in (1) of Example 6.

(3) Polymer Film

A polymer film was prepared in the same manner as in (3) of Example 6, except that the polyamide resin obtained in (2) of Comparative Example 7 was used instead of the polyamide resin obtained in (2) of Example 6.

Comparative Example 8

(1) Polyamide resin solution

A polyamide resin solution was prepared in the same manner as in (1) of Example 6, except that an end-capping agent was not added.

(2) Polyamide resin

A polyamide resin was prepared in the same manner as in (2) of Example 6, except that the polyamide resin solution obtained in (1) of Comparative Example 8 was used instead of the polyamide resin solution obtained in (1) of Example 6.

(3) Polymer Film

A polymer film was prepared in the same manner as in (3) of Example 6, except that the polyamide resin obtained in (2) of Comparative Example 8 was used instead of the polyamide resin obtained in (2) of Example 6.

Comparative Example 9

(1) Polyamide resin solution

A polyamide resin solution was prepared in the same manner as in (1) of Example 8, except that an end-capping agent was not added.

(2) Polyamide resin

A polyamide resin was prepared in the same manner as in (2) of Example 8, except that the polyamide resin solution obtained in (1) of Comparative Example 9 was used instead of the polyamide resin solution obtained in (1) of Example 8.

(3) Polymer Film

A polymer film was prepared in the same manner as in (3) of Example 8, except that the polyamide resin obtained in (2) of Comparative Example 9 was used instead of the polyamide resin obtained in (2) of Example 8.

Experimental Example 1

The relative viscosities of the polymer resin compositions obtained in Examples 1 to 5 and 12 and Comparative Example 4 were measured, and the results are shown in Table 1 below.

Specifically, the relative viscosity was measured under a constant reflux system at 25±0.2° C. according to ASTM D 2196: test method of non-Newtonian materials by Brookfield DV-2T Rotational Viscometer, wherein as Brookfield silicone standard oil, a number of standard solutions having a viscosity range of 0.1 KcP to 10000 KcP was used, the measurement was performed with a spindle LV-4 (64), 0.3-100 RPM, and the unit was KcP.

TABLE 1

| Category | Example 1 | Example 2 | Example 3 | Example 4 | Example 5 | Example 12 | Comparative Example 4 |
|---|---|---|---|---|---|---|---|
| Viscosity modifier | LiCl | LiCl | LiCl | $CaCl_2$ | $CaCl_2$ | LiCl | — |
| Relative viscosity (KcP) | 59.8 | 64.8 | 59.8 | 10.2 | 18.2 | 58.6 | more than 200 |

Looking at Table 1, it was confirmed that in the polymer resin compositions of Examples to which the viscosity modifier was added, the viscosity was measured to be as low as 10.2 KcP or more and 64.8 KcP or less, whereas in the polymer resin composition of Comparative Example 4 to which the viscosity modifier was not added, the relative viscosity increased excessively over 200 KcP, which was disadvantageous in processability during film formation.

Experimental Example 2

The following properties were measured or evaluated for the polyamide resins or the polymer films obtained in Examples 1 to 5 and 12 and Comparative Examples 1 to 3, and the results are shown in Table 2 below.

(1) Yellow index (Y.I.): The yellow index of the polymer film was measured according to the measurement method of ASTM E313 using a COH-400 Spectrophotometer (NIPPON DENSHOKU INDUSTRIES).

(2) Transmittance: The total light transmittance of the polymer film was measured using a Shimadzu UV-2600 UV-vis spectrometer. In the measurement results, the transmittance (T, @388 nm) for ultraviolet light at a wavelength of 388 nm and the transmittance (T, @550 nm) for visible light at wavelength of 550 nm were shown.

(3) Haze: The haze value of the polymer film was measured according to the ASTM D1003 test method using a COH-400 Spectrophotometer (Nippon Denshoku Industries).

(4) Molecular weight and polydispersity index (PDI): The weight average molecular weight (Mw) and the number average molecular weight (Mn) of the polyamide resin were measured by gel permeation chromatography (GPC, manufactured by Waters), and the polydispersity index (PDI) was calculated by dividing the weight average molecular weight by the number average molecular weight. Specifically, the measurement was performed using a 600 mm long column connecting two Polymer Laboratories PLgel MIX-B Columns (300 mm in length), through Waters 2605 Refractive Index (RI) Detector, wherein the evaluation temperature was 50 to 75° C. (about 65° C.), DMF 100 wt % solvent was used, the flow rate was 1 mL/min, and the sample was prepared at a concentration of 1 mg/mL and supplied in an amount of 100 µL for 25 minutes. The molecular weights could be determined using calibration curves formed using polystyrene standards. As the molecular weight of polystyrene standard products, 7 types of 3940/9600/31420/113300/327300/1270000/4230000 were used.

(5) Bending Property: The folding endurance of the polymer films was evaluated using an MIT type folding endurance tester. Specifically, a specimen (1 cm*7 cm) of the polymer film was loaded into the folding endurance tester, and folded to an angle of 135° at a rate of 175 rpm on the left and right sides of the specimen, with a radius of curvature of 0.8 mm and a load of 250 g, and until the specimen was bended and fractured. The number of reciprocating bending cycles was measured as the folding endurance.

(6) Pencil Hardness: The pencil hardness of the polymer films was measured according to the ASTM D3363 test method using a Pencil Hardness Tester. Specifically, varying hardness values of pencils were fixed to the tester and scratched on the polymer film, and the degree of occurrence of a scratch on the polymer film was observed with the naked eye or with a microscope. When more than 70% of the total number of scratches were not observed, a value corresponding to the hardness of the pencil was evaluated as the pencil hardness of the polymer film.

The pencil hardness is increased in the order of B grade, F grade and H grade. Within the same grade, the higher the number, the higher the hardness. Within the grade, the higher the number, the higher the hardness.

film obtained from the polyamide resin of Examples had a low yellow index of 2.32 to 2.89 and a low haze value of 0.56% to 0.97%, thereby securing excellent transparency. It was also confirmed that it had a high pencil hardness of 3H to 4H grade and a folding endurance that was broken at the number of reciprocating bending cycles from 9785 or more, thereby securing excellent mechanical properties (scratch resistance and folding endurance).

On the other hand, in the case of the polymer films obtained from the polyamide resins of Comparative Examples 1, 2, and 3 in which TPC powder and IPC powder were added simultaneously or sequentially, it was confirmed that the yellow index was 4.59 to 25.10 and the haze value was 1.61% to 24.21%, which increased compared to Examples, confirming that the transparency was poor. The is considered to be because in the case of Comparative Examples 1, 2, and 3, due to the difference in solubility and reactivity between the TPC powder and the IPC powder, the block by TPC is excessively formed, and the crystallinity of the polyamide resin is enhanced.

Experimental Example 3

The properties of the individual crystals contained in the polyamide resins obtained in Examples 1 to 2 and Comparative Examples 1 to 3 were measured by the following method using a small-angle X-ray scattering method (SAXS), and the results are shown in Table 3 below.

The polymer films obtained in Examples and Comparative Examples were used to prepare a sample with a size of 1 cm in width*1 cm in length. The sample was set on a small angle X-ray scattering apparatus (PLS-9A USAXS beam line) having a camera length of 2.5 m, 6.5 m at room temperature)(23° C., and irradiated with X-rays having an energy of 11.1 KeV, 19.9 KeV to obtain a scattering pattern. The scattering pattern was analyzed through the analysis equipment (NIST SANS package) mounted on the small angle X-ray scattering apparatus to determine the average particle size (2 Rc), dimensionality, and crystallinity degree of the individual crystals.

Specifically, the analysis of the average particle size, dimensionality, and crystallinity degree of the individual crystals was performed through a computer program (NIST

TABLE 2

| Category | Example 1 | Example 2 | Example 3 | Example 4 | Example 5 | Example 12 | Comparative Example 1 | Comparative Example 2 | Comparative Example 3 |
|---|---|---|---|---|---|---|---|---|---|
| Viscosity modifier | LiCl | LiCl | LiCl | CaCl$_2$ | CaCl$_2$ | LiCl | — | — | — |
| Y.I. | 2.32 | 2.54 | 2.40 | 2.75 | 2.89 | 2.56 | 8.55 | 25.10 | 4.59 |
| T (%) @ 550 nm | 86.87 | 86.75 | 88.36 | 88.68 | 88.50 | 88.65 | 85.63 | 75.94 | 87.57 |
| T (%) @ 388 nm | 71.74 | 68.75 | 78.40 | 74.4 | 71.0 | 72.2 | 51.01 | 31.62 | 65.04 |
| Haze (%) | 0.56 | 0.68 | 0.47 | 0.83 | 0.97 | 0.62 | 3.43 | 24.21 | 1.61 |
| Mw(g/mol) | 498000 | 468000 | 498000 | 488000 | 463000 | 475000 | 412000 | 350000 | 382000 |
| Bending property (Cycle) | 13098 | 10528 | 200000 or more | 10201 | 9785 | 12521 | 5210 | 785 | 4513 |
| PDI | 1.95 | 2.95 | 1.95 | 1.88 | 2.71 | 2.42 | 2.05 | 2.02 | 1.98 |
| Pencil hardness | 3H | 4H | 2H | 3H | 4H | 3H | 1H | F | 1H |

Looking at Table 2, the polyamide resins of Examples prepared using the acyl chloride complex powders according to Preparation Examples 1 to 2 was measured to have a high weight average molecular weight of 463000 g/mol to 498000 g/mol. Further, it was confirmed that the polymer SANS package) using the data obtained from a small angle X-ray scattering apparatus (PLS 9A beamline). More specifically, the average particle size of the individual crystals can be obtained through the calculation of computer program (NIST SANS package) for the diameter distribution curve of crystals which is obtained by fitting the shape of individual crystals contained in the sample to a solid sphere model, plotting the obtained wavenumber q (unit: Å$^{-1}$) and scattering intensity I (unit: a.u.), and convoluting the plot with a Schulz-Zimm distribution.

TABLE 3

|  | Average particle size of crystals (nm) | Dimensionality | Crystallinity degree (%) |
|---|---|---|---|
| Example 1 | 5.0 | 3.7 | less than 20%, difficult to measure |
| Example 2 | 6.8 | — | less than 20%, difficult to measure |
| Comparative Example 1 | 8.4 | 4.0 | less than 20%, difficult to measure |
| Comparative Example 2 | 13.4 | 3.2 | 24% |
| Comparative Example 3 | 8.1 | — | less than 20%, difficult to measure |

As shown in Table 3, it could be confirmed that the average particle size of the individual crystals contained in the polyamide resins obtained in Examples 1 to 2 was measured to be as small as 5 nm to 6.8 nm, whereas the average particle size of the individual crystals contained in the polyamide resin obtained in Comparative Example 1 was 8.4 nm, the average particle size of the individual crystals contained in the polyamide resin obtained in Comparative Example 2 was 13.4 nm, and the average particle size of the individual crystals contained in the polyamide resin obtained in Comparative Example 3 was 8.1 nm, which increased as compared to Examples. In addition, it was confirmed that the degree of crystallinity of the polyamide resins obtained in Examples was less than 20%, showing a low degree of crystallinity, whereas the degree of crystallinity of the polyamide resin obtained in Comparative Example 2 was 24%, which increased compared to Examples. Thereby, it was confirmed that in the case of the polyamide resins obtained in Examples, the growth of the length of the crystalline block consisting of a repeat unit obtained by an amide reaction of terephthaloyl chloride (TPC) and 2,2'-bis(trifluoromethyl)-4,4'-biphenyldiamine (TFDB) was suppressed as compared with Comparative Examples.

Experimental Example 4

In addition, the chlorine (Cl) content was measured 0.5 g of the synthesized polymer film obtained in Examples 1 to 5 and 12 using an inductively coupled plasma spectrometer (ICP-OES: Optima 8300 DV, Perkin Elmer), and the results are shown in Table 4 below.

Specifically, 0.5 g of the polymer film was mixed with 5 mL of nitric acid and 1 mL of hydrogen peroxide, dissolved at 1300 W for 120 minutes using a microwave, cooled to room temperature, filtered through a 0.45 μm PTFE filter, and then diluted to 10 mL with tertiary ultrapure water to prepare a sample.

Thereafter, the prepared sample was subjected to quantitative analysis using an inductively coupled plasma spectrometer set under the following conditions.

Main column: IonPac AS18 analytical (4×250 mm),
Guard Column: IonPac AG18 guard (4×50 mm),
Eluent type: KOH (30.5 mM),
Eluent flow rate: 1 mL/min,
Detector: Suppressed Conductivity Detector,
Suppressor Current: 76 mA,
Injection volume: 20 μl
Isocratic/Gradient conditions: Isocratic conditions.

TABLE 4

|  | Example 1 | Example 2 | Example 3 | Example 4 | Example 5 | Example 12 |
|---|---|---|---|---|---|---|
| chlorine content (ppm) | 55 | 70 | 200 | 210 | 250 | 60 |

As shown in Table 4, it was confirmed that in the polymer film obtained in Examples, the chlorine content was measured to be as low as 55 ppm or more and 250 ppm or less based on 0.5 g of the polymer film, so that most of the viscosity modifier that was added to the polymer resin composition was removed.

Experimental Example 5

The following properties were measured or evaluated for the polyamide resin solutions obtained in Examples 6 to 12 and Comparative Examples 8 to 9, and the results are shown in Table 5 below.

(1) Storage stability: Under a constant reflux system at 25±0.2° C., the solid content of the polyamide resin solutions obtained in Examples and Comparative Examples was adjusted to 8 wt. % using a dimethylacetamide (DMAc) solvent, and the relative viscosity was measured according to ASTM D 2196: test method of non-Newtonian materials by Brookfield DV-2T Rotational Viscometer, wherein as Brookfield silicone standard oil, a number of standard solutions having a viscosity range of 5000 cps to 100000 cps was used, the measurement was performed with a spindle LV-4 (64), 0.3-100 RPM, and the unit was cps (mPa·s).

The polyamide resin solutions obtained in Examples and Comparative Examples were stored at room temperature for 24 hours, and then the relative viscosity was measured according to ASTM D 2196: test method of non-Newtonian materials by Brookfield DV-2T Rotational Viscometer, wherein as Brookfield silicone standard oil, a number of standard solutions having a viscosity range of 5000 cps to 100000 cps was used, the measurement was performed with a spindle LV-4 (64), 0.3-100 RPM, and the unit was cps (mPa·s).

Then, the viscosity change rate was calculated according to the following Mathematical Formula 1 to evaluate the storage stability.

[Mathematical Formula 1]

Viscosity change rate (%)=Absolute value of (Viscosity of polymer resin composition after storage at room temperature for 24 hours−Viscosity of polymer resin composition before storage at room temperature for 24 hours)/Viscosity of polymer resin composition before storage at room temperature for 24 hours*100.

TABLE 5

| Category | Example 6 | Example 7 | Example 8 | Example 9 | Example 10 | Example 11 | Example 12 | Comparative Example 8 | Comparative Example 9 |
|---|---|---|---|---|---|---|---|---|---|
| Molar ratio of TFDB:acyl chloride complex | 100:102 | 100:102 | 102:100 | 102:100 | 102:100 | 102:100 | 100:102 | 100:102 | 102:100 |
| End-capping agent | Cyclohexylamine | Aniline | 5-norbornene-2,3-dicarboxylic anhydride | Maleic anhydride | Cyclohexane carbonyl chloride | Benzoyl chloride | Cyclohexylamine | — | — |
| Viscosity before storage at room temperature for 24 hours (cps) | 22600 | 22400 | 19900 | 19900 | 20000 | 20000 | 21800 | 22600 | 20000 |
| Viscosity after storage at room temperature for 24 hours (cps) | 22800 | 22200 | 19800 | 19600 | 19900 | 20000 | 21700 | 32500 | 28100 |
| Storage stability (%) | 0.88 | 0.89 | 0.50 | 1.51 | 0.50 | 0 | 0.46 | 43.81 | 40.50 |

Looking at Table 5, in the case of the polyamide resin solution of Examples to which an end-capping agent was added, it was confirmed that they exhibited a low viscosity change rate of 0.46% or more and 1.51% or less at a solid content of about 8 weight %, thereby securing excellent storage stability.

On the other hand, in the case of the polyamide resin solution of Comparative Example 8 and Comparative Example 9 in which an end-capping agent was not added, it was confirmed that the viscosity change rate increased from 40.50% to 43.81% at a solid content of approximately 8 wt. % as compared with Examples, and the storage stability decreased due to the viscosity change during long-term storage.

Experimental Example 6

The following properties were measured or evaluated for the polymer films obtained in Examples 6 to 11 and Comparative Examples 5 to 7, and the results are shown in Table 6 below.

(1) Thickness: The thickness of the polymer film was measured using a thickness measuring device.

(2) Haze:: The haze value of the polymer film was measured according to the ASTM D1003 test method using a COH-400 Spectrophotometer (NIPPON DENSHOKU INDUSTRIES).

TABLE 6

| Category | Example 6 | Example 7 | Example 8 | Example 9 | Example 10 | Example 11 | Comparative Example 5 | Comparative Example 6 | Comparative Example 7 |
|---|---|---|---|---|---|---|---|---|---|
| Molar ratio of TFDB:acyl chloride complex | 100:102 | 100:102 | 102:100 | 102:100 | 102:100 | 102:100 | 100:100 | 100:100 | 100:100 |
| End-capping agent | Cyclohexylamine | Aniline | 5-norbornene-2,3-dicarboxylic anhydride | Maleic anhydride | Cyclohexane carbonyl chloride | Benzoyl chloride | — | — | — |
| Thickness (μm) | 50 | 50 | 50 | 50 | 50 | 50 | 51 | 51 | 50 |
| Haze (%) | 0.92 | 0.77 | 0.92 | 0.93 | 0.74 | 0.8 | 3.43 | 24.21 | 1.61 |

Looking at Table 6, in the case of the polymer films obtained from the polyamide resins of Examples 6 to 11 prepared using the acyl chloride complex powder according to Preparation Example 1, it was confirmed that they exhibited a low haze value of 0.74% or more and 0.93% or less at a thickness of approximately 50 μm, thereby securing excellent transparency. On the other hand, in the case of the polymer films obtained from the polyamide resins of Comparative Examples 5 to 7 in which TPC powder and IPC powder were added simultaneously or sequentially, it was confirmed that the haze value increased from 1.61% to 24.21% at a thickness of approximately 50 μm, as compared with Examples, and thus the transparency was poor. in the case of Comparative Examples 5-7, due to the difference in solubility and reactivity between the TPC powder and the IPC powder, it seems that the block formed by TPC is excessively formed, thereby increasing the crystallinity of the polyamide resin.

Experimental Example 7

The properties of the individual crystals contained in the polyamide resins obtained in Example 6 and Comparative Examples 5 to 7 were measured by the following method using a small-angle X-ray scattering method (SAXS), and the results are shown in Table 7 below.

The polymer films obtained in Examples and Comparative Examples were used to prepare a sample with a size of 1 cm in width*1 cm in length. The sample was set on a small angle X-ray scattering apparatus (PLS-9A USAXS beam line) having a camera length of 2.5 m, 6.5 m at room temperature (23° C.), and irradiated with X-rays having an energy of 11.1 KeV, 19.9 KeV to obtain a scattering pattern. The scattering pattern was analyzed through the analysis equipment (NIST SANS package) mounted on the small angle X-ray scattering apparatus to determine the average particle size (2 Rc), dimensionality, and crystallinity degree of the individual crystals.

Specifically, the analysis of the average particle size, dimensionality, and crystallinity degree of the individual crystals was performed through a computer program (NIST SANS package) using the data obtained from a small angle X-ray scattering apparatus (PLS 9A beamline). More specifically, the average particle size of the individual crystals can be obtained through the calculation of computer program (NIST SANS package) for the diameter distribution curve of crystals which is obtained by fitting the shape of individual crystals contained in the sample to a solid sphere model, plotting the obtained wavenumber q (unit: Å$^{-1}$) and scattering intensity I (unit: a.u.), and convoluting the plot with a Schulz-Zimm distribution.

TABLE 7

| | Average particle size of crystals (nm) | Dimensionality | Crystallinity degree (%) |
| --- | --- | --- | --- |
| Example 6 | 5.4 | 3.6 | less than 20%, difficult to measure |
| Comparative Example 5 | 8.4 | 4.0 | less than 20%, difficult to measure |
| Comparative Example 6 | 13.4 | 3.2 | 24% |
| Comparative Example 7 | 8.1 | — | less than 20%, difficult to measure |

As shown in Table 7, it could be confirmed that the average particle size of the individual crystals contained in the polyamide resin obtained in Example 6 was measured to be as small as 5.4 nm, whereas the average particle size of the individual crystals contained in the polyamide resin obtained in Comparative Example 5 was 8.4 nm, the average particle size of the individual crystals contained in the polyamide resin obtained in Comparative Example 6 was 13.4 nm, and the average particle size of the individual crystals contained in the polyamide resin obtained in Comparative Example 7 was 8.1 nm, which increased as compared with Examples. In addition, it was confirmed that the crystallinity degree of the polyamide resin obtained in Example 6 was less than 20%, showing a low degree of crystallinity, whereas the degree of crystallinity of the polyamide resin obtained in Comparative Example 6 was 24%, which increased as compared with Examples. Thereby, it was confirmed that in the case of the polyamide resin obtained in Example 6, the growth of the length of the crystalline block consisting of a repeat unit obtained by an amide reaction of terephthaloyl chloride (TPC) and 2,2'-bis (trifluoromethyl)-4,4'-biphenyldiamine (TFDB) was suppressed as compared with Comparative Example.

EXPLANATION OF SYMBOLS

1: individual crystals

2: average particle size of individual crystals

3: amorphous polymer chain

The invention claimed is:

1. A polymer resin composition comprising:
   a polyamide resin in which an average particle size of individual crystals measured by a small-angle X-ray scattering apparatus is 8.0 nm or less; and
   at least one compound selected from the group consisting of a metal salt compound and an end-capping agent compound,
   wherein an amorphous polymer chain is present between the individual crystals having an average particle size of 8.0 nm or less,
   wherein the individual crystals having an average particle size of 8.0 nm or less comprises a first polyamide segment including a repeat unit represented by Chemical Formula 1, or a block composed thereof:

[Chemical Formula 1]

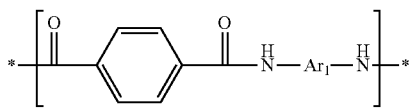

in the Chemical Formula 1, $Ar_1$ is a substituted or unsubstituted arylene group having 6 to 20 carbon atoms, or a substituted or unsubstituted heteroarylene group having 2 to 20 carbon atoms,
wherein the amorphous polymer chain comprises,
a second polyamide segment including a repeat unit represented by Chemical formula 2, or a block composed thereof:

[Chemical Formula 2]

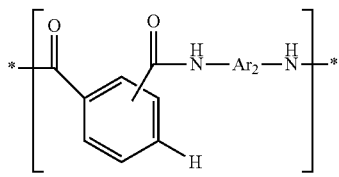

in the Chemical Formula 2,
$Ar_2$ is a substituted or unsubstituted arylene group having 6 to 20 carbon atoms, or a substituted or unsubstituted heteroarylene group having 2 to 20 carbon atoms, and
wherein the first polyamide segment and the second polyamide segment form a backbone chain containing an alternating repeat unit represented by Chemical Formula 4:

[Chemical Formula 4]

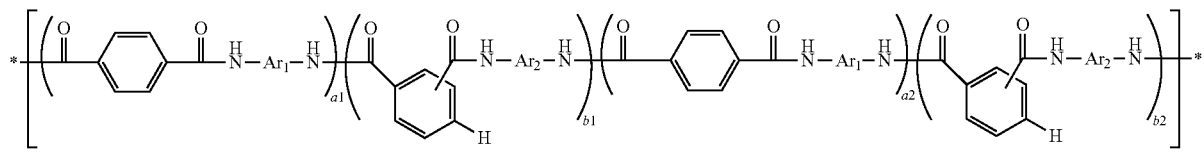

in the Chemical Formula 4,
$Ar_1$ and $Ar^2$ are each independently a substituted or unsubstituted arylene group having 6 to 20 carbon atoms, or a substituted or unsubstituted heteroarylene group having 2 to 20 carbon atoms,
a1 and a2 are each independently an integer of 1 to 10, and
b1 and b2 are each independently an integer of 1 to 5.

2. The polymer resin composition according to claim 1, wherein the average particle size of the individual crystals is measured through an analytical equipment by irradiating X-rays with energies of 10 KeV to 20 KeV in a small-angle X-ray scattering apparatus to obtain a scattering pattern and fitting the scattering pattern to a solid sphere model.

3. The polymer resin composition according to claim 1, wherein a distance between the individual crystals having an average particle size of 8.0 nm or less is 0.1 nm to 100 nm.

4. The polymer resin composition according to claim 1, wherein the individual crystals having an average particle size of 8.0 nm or less comprises a first aromatic amide repeat unit derived from a product of a 1,4-aromatic diacyl compound and an aromatic diamine compound.

5. The polymer resin composition according to claim 1, wherein the amorphous polymer chain comprises a second aromatic amide repeat unit derived from a product of a 1,2-aromatic diacyl compound and an aromatic diamine compound, or a third aromatic amide repeat unit derived from a product of a 1,3-aromatic diacyl compound and an aromatic diamine compound.

6. The polymer resin composition according to claim 1, wherein the first polyamide segment has a number average molecular weight of 100 g/mol to 5000 g/mol.

7. The polymer resin composition according to claim 1, wherein the repeat unit represented by Chemical Formula 1 is contained in an amount of 40 mol % to 95 mol % based on the total repeat units contained in the polyamide resin.

8. The polymer resin composition according to claim 1, wherein the repeat unit represented by the Chemical Formula 1 is contained at an amount of 60 mol % to 95 mol %, and the repeat unit represented by the Chemical Formula 2 is contained at an amount of 5 mol % to 40 mol % based on the total repeat units contained in the polyamide resin.

9. The polymer resin composition according to claim 1, wherein the polymer resin composition has a relative viscosity of 100 KcP or less.

10. The polymer resin composition according to claim 9, wherein the polymer resin composition further comprises an organic solvent, and
the polyamide resin is contained in the polyamide resin composition at an amount of 1 weight % or more and 30 weight % or less.

11. The polymer resin composition according to claim 1, wherein a solid content of the polyamide resin in the polyamide resin composition is 1 weight % or more and 20 weight % or less, and wherein a relative viscosity of the polyamide resin composition is 100 KcP or less.

12. The polymer resin composition according to claim 1, wherein the end-capping agent compound comprises at least one compound selected from the group consisting of a monoamine compound, a monoacyl halide compound, and a monoacid anhydride compound.

13. The polymer resin composition according to claim 12, wherein the polymer resin composition has a viscosity change rate according to the following Mathematical Formula 1 of 5% or less,

[Mathematical Formula 1]
Viscosity change rate (%)=Absolute value of (Viscosity of the polymer resin composition after storage at room temperature for 24 hours−Viscosity of the polymer resin composition before storage at room temperature for 24 hours)/Viscosity of the polymer resin composition before storage at room temperature for 24 hours*100.

14. A polymer film comprising a cured product of the polymer resin composition according to claim 1.

15. A resin laminate comprising:
a substrate including the polymer film of claim 14; and
a hard coating layer formed on at least one side of the substrate.

* * * * *